United States Patent
Elish et al.

(10) Patent No.: US 9,233,340 B1
(45) Date of Patent: Jan. 12, 2016

(54) CYLINDER ARRANGEMENT AND METHOD OF USE FOR ENERGY RECOVERY WITH SEAWATER DESALINATION

(71) Applicant: RENERGY TECHNOLOGIES LTD., Netanya (IL)

(72) Inventors: Oded Elish, Kiryat Tivon (IL); Yaacov Mansdorf, Ramat HaSharon (IL); Netanel Benichou, Moshav Nir Etzion (IL)

(73) Assignee: RENERGY TECHNOLOGIES LTD., Netanya (IL)

( * ) Notice: Subject to any disclaimer, the term of this patent is extended or adjusted under 35 U.S.C. 154(b) by 0 days.

(21) Appl. No.: 14/595,333

(22) Filed: Jan. 13, 2015

(51) Int. Cl.
| | |
|---|---|
| *B01D 61/06* | (2006.01) |
| *C02F 1/44* | (2006.01) |
| *C02F 1/00* | (2006.01) |
| *B01D 61/12* | (2006.01) |
| *C02F 101/10* | (2006.01) |
| *C02F 103/08* | (2006.01) |

(52) U.S. Cl.
CPC .............. *B01D 61/06* (2013.01); *B01D 61/12* (2013.01); *C02F 1/008* (2013.01); *C02F 1/441* (2013.01); *B01D 2311/14* (2013.01); *B01D 2313/24* (2013.01); *C02F 2101/10* (2013.01); *C02F 2103/08* (2013.01); *C02F 2209/03* (2013.01)

(58) Field of Classification Search
CPC ........................................................ B01D 61/06
See application file for complete search history.

(56) References Cited

U.S. PATENT DOCUMENTS

| | | | | |
|---|---|---|---|---|
| 3,489,159 A * | 1/1970 | Cheng | ..................... | B01D 61/06 137/14 |
| 3,707,881 A * | 1/1973 | Neuhaus | ................. | F01L 15/08 91/306 |
| 4,178,240 A * | 12/1979 | Pinkerton | ................ | A61M 1/16 137/99 |
| 4,367,140 A * | 1/1983 | Wilson | .................... | B01D 61/06 137/544 |
| 4,913,809 A * | 4/1990 | Sawada | .................. | B01D 61/06 210/117 |
| 5,628,198 A * | 5/1997 | Permar | ................... | B01D 61/06 62/123 |
| 6,017,200 A * | 1/2000 | Childs | .................... | B01D 61/06 417/390 |
| 6,537,035 B2 * | 3/2003 | Shumway | ............... | F04F 13/00 417/64 |
| 2001/0017278 A1* | 8/2001 | Verde | ...................... | F04B 9/115 210/321.66 |
| 2006/0037895 A1* | 2/2006 | Shumway | .............. | B01D 61/06 210/137 |
| 2015/0184647 A1* | 7/2015 | Jayaram | ............... | B01D 61/025 417/394 |

FOREIGN PATENT DOCUMENTS

| | | | | | |
|---|---|---|---|---|---|
| ES | CA 2420125 | A1 * | 12/2002 | ............ | B01D 61/06 |
| FR | WO 0077397 | A1 * | 12/2000 | ............ | B01D 61/06 |
| GB | 2319570 | A * | 5/1998 | ............ | B01D 61/06 |
| GB | 2356432 | A * | 5/2001 | ............ | B01D 61/06 |

* cited by examiner

*Primary Examiner* — Krishnan S Menon
(74) *Attorney, Agent, or Firm* — Mark M. Friedman

(57) ABSTRACT

A cylinder arrangement for use with a reverse osmosis membrane array that receives pressurized fresh brine and generates fresh water and pressurized spent brine includes a hollow cylinder with an internal volume subdivided by a piston into two chambers. An arrangement of flow connections directs the pressurized spent brine to one chamber so as to act on the piston, thereby applying pressure to fresh brine within the other chamber for delivery to the reverse osmosis membrane array. The cylinder arrangement includes a pressure vessel enveloping substantially the entirety of the hollow cylinder, so as to define an enveloping volume in fluid flow communication with one of the chambers of the cylinder. Preferred implementations employ a pair of cylinders coaligned, and with their pistons interconnected by a common piston rod.

14 Claims, 14 Drawing Sheets

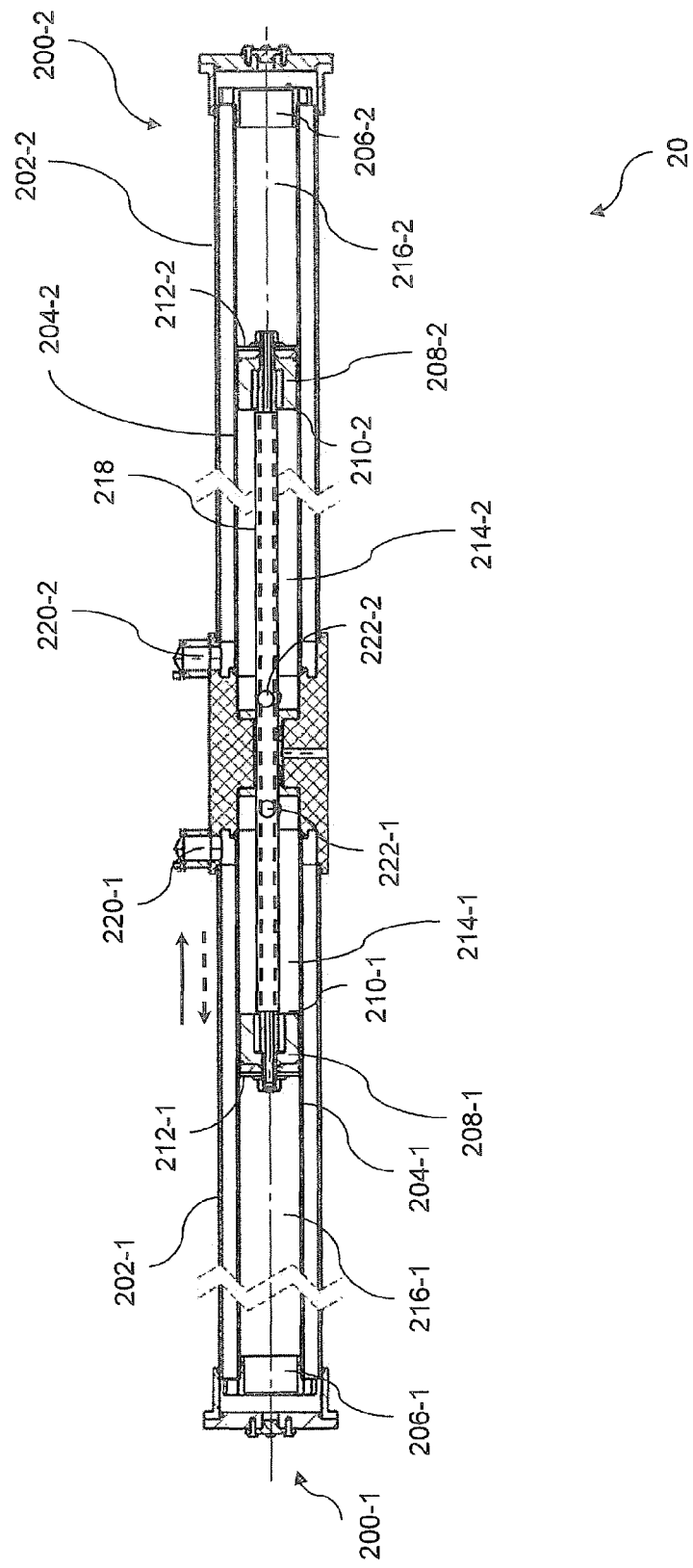

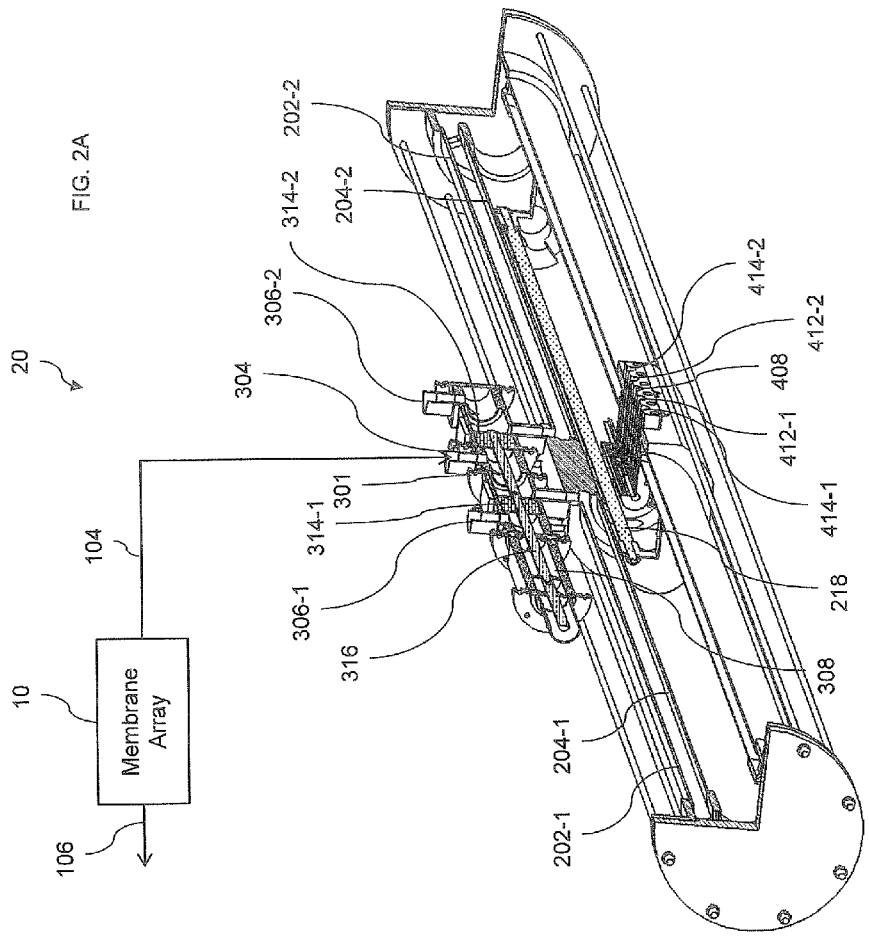

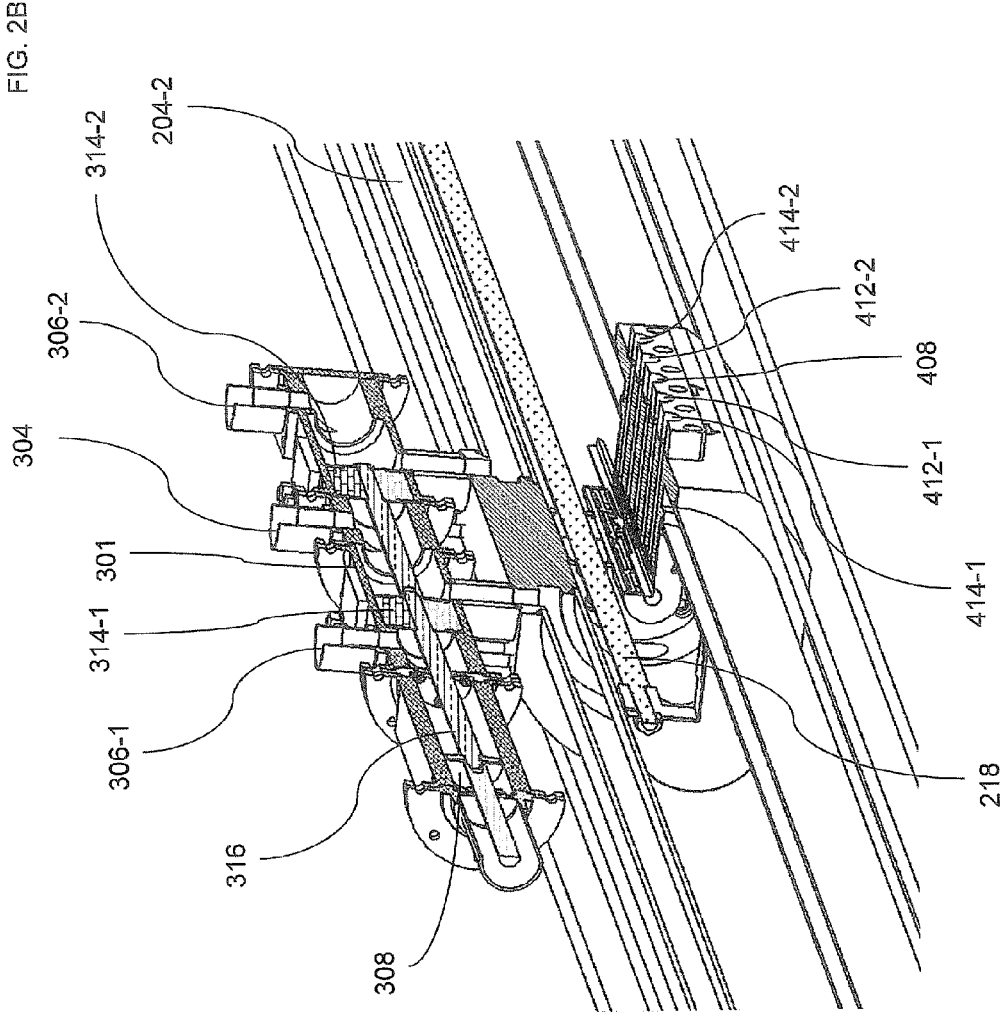

CYLINDER ARRANGEMENT AND METHOD OF USE FOR ENERGY RECOVERY WITH SEAWATER DESALINATION

FIELD AND BACKGROUND OF THE INVENTION

The present invention relates to equipment for desalination of seawater by reverse osmosis.

Seawater reverse osmosis desalination systems have been used for obtaining fresh water from seawater in which the concentration of salt is typically 40,000 ppm. The seawater, also referred to as "fresh brine", is passed over the reverse osmosis semi permeable membrane by a pump at high pressure, typically in the range of 20-120 bar. The percentage of fresh brine converted to fresh water (the "recovery ratio") is typically on the order of 40%-70%. In order to reduce energy wastage, energy should be recovered from the remaining 30%-60% high pressure brine before the liquid is discarded.

One example of such an energy recovery system based on a double-piston end-to-end cylinder arrangement is disclosed in U.S. Pat. No. 4,637,783 to Andeen. High pressure spent brine delivered to one cylinder applies pressure to fresh brine on the other side of the piston to supply the fresh brine into the reverse osmosis membrane array. A difference in surface area between the two sides of the piston (due to the piston rod) results in slight pressure amplification. At the same time, the motion of the piston rod causes expulsion of the spent brine from the paired cylinder and draws in fresh brine to the other cylinder, ready for the reverse stroke.

SUMMARY OF THE INVENTION

The present invention is a cylinder arrangement and method of use for providing a functionality for energy recovery with seawater desalination.

According to the teachings of an embodiment of the present invention there is provided, a cylinder arrangement for use with a reverse osmosis membrane array that receives pressurized fresh brine and generates pressurized spent brine, the cylinder arrangement comprising: (a) a hollow cylinder having an inner surface and an internal volume; (b) a piston in sliding engagement with the inner surface so as to subdivide the internal volume into a first internal volume forming at least part of a first chamber and a second internal volume forming at least part of a second chamber; and (c) an arrangement of flow connections configured for directing the pressurized spent brine to the first chamber so as to act on the piston, thereby applying pressure to fresh brine within the second chamber for delivery to the reverse osmosis membrane array, wherein the cylinder arrangement further comprises a pressure vessel enveloping substantially the entirety of the hollow cylinder, the pressure vessel defining at least one enveloping volume selected from the group consisting of: a first enveloping volume in fluid flow communication with the first internal volume; and a second enveloping volume in fluid flow communication with the second internal volume.

According to a further feature of an embodiment of the present invention, the piston has an inner face facing the second internal volume and an outer face facing the first internal volume, the outer face having larger effective surface area than the inner face for pressure amplification.

According to a further feature of an embodiment of the present invention, there is provided a paired cylinder arrangement have first and second cylinder arrangements as described above, wherein the pistons of the first and second cylinder arrangements are mechanically linked such that, when the pressurized spent brine is directed to the first chamber of the first cylinder arrangement the pressurized spent brine is simultaneously discharged from the first chamber of the second cylinder arrangement, and such that, when the pressurized spent brine is directed to the first chamber of the second cylinder arrangement the pressurized spent brine is simultaneously discharged from the first chamber of the first cylinder arrangement.

According to a further feature of an embodiment of the present invention, the pistons of the first and second cylinder arrangements are mechanically linked by at least one piston rod interconnecting the pistons of the first and second cylinder arrangements for simultaneous movement.

According to a further feature of an embodiment of the present invention, the arrangement of flow connections comprises: (a) a flow selector having an inlet port for an inflow of pressurized spent brine from the reverse osmosis membrane array, the flow selector assuming a first state in which the inlet port is in fluid connection with the first chamber of the first cylinder arrangement and a second state in which the inlet port is in fluid connection with the first chamber of the second cylinder arrangement; (b) a bidirectional hydraulic actuator associated with the flow selector for switching the flow selector between the first state and the second state; and (c) a hydraulic switch having a switch inlet port for the inflow of a pressurized hydraulic fluid and having two hydraulic connections to the hydraulic actuator for actuating the hydraulic actuator, wherein the hydraulic switch is deployed so as to be acted on by the piston of the first cylinder arrangement during a stroke of the piston so as to assume a first switch state in which pressure from the switch inlet port is directed to a first of the hydraulic connections so as to actuate the actuator to switch the flow selector to the second state, and wherein the hydraulic switch is further deployed so as to be acted on by the piston of the second cylinder arrangement during a stroke of the piston so as to assume a second switch state in which pressure from the switch inlet port is directed to a second of the hydraulic connections so as to actuate the actuator to switch the flow selector to the first state.

According to a further feature of an embodiment of the present invention, the hydraulic actuator includes an actuator piston displaceable within an actuator cylinder.

According to a further feature of a embodiment of the present invention, the switch inlet port is connected to receive spent brine delivered from an outlet of the reverse osmosis membrane array.

There is also provided according to the teachings of an embodiment of the present invention, a paired cylinder arrangement for use with a reverse osmosis membrane array that receives pressurized fresh brine and generates pressurized spent brine, the cylinder arrangement comprising: (a) a first cylinder assembly comprising: (i) a first hollow cylinder; and (ii) a first piston in sliding engagement within the first hollow cylinder so as to at least partially define a first chamber and a second chamber; (b) a second cylinder assembly comprising: (i) a second hollow cylinder; and (ii) a second piston in sliding engagement within the second hollow cylinder so as to at least partially define a first chamber and a second chamber; (c) a flow selector having an inlet port for an inflow of pressurized spent brine from the reverse osmosis membrane array, the flow selector assuming a first state in which the inlet port is in fluid connection with the first chamber of the first cylinder assembly and a second state in which the inlet port is in fluid connection with the first chamber of the second cylinder assembly; (d) a bidirectional hydraulic actuator associated with the flow selector for switching the flow selector between the first state and the second state; and (e) a hydraulic switch having a switch inlet port for the inflow of a pressurized hydraulic fluid and having two hydraulic connections to the hydraulic actuator for actuating the hydraulic actuator, wherein the hydraulic switch is deployed so as to be acted on by the first piston during a stroke of the first piston so as to assume a first switch state in which pressure from the switch inlet port is directed to a first of the hydraulic connections so as to actuate the actuator to switch the flow selector to the second state, and wherein the hydraulic switch is further deployed so as to be acted on by the second piston during a stroke of the second piston so as to assume a second switch state in which pressure from the switch inlet port is directed to a second of the hydraulic connections so as to actuate the actuator to switch the flow selector to the first state.

According to a further feature of an embodiment of the present invention, the first cylinder assembly further comprises a pressure vessel enveloping substantially the entirety of the first hollow cylinder, the pressure vessel defining at least one enveloping volume selected from the group consisting of: a first enveloping volume in fluid flow communication to form part of the first chamber; and a second enveloping volume in fluid flow communication to form part of the second chamber, and wherein the second cylinder assembly further comprises a pressure vessel enveloping substantially the entirety of the second hollow cylinder, the pressure vessel defining at least one enveloping volume selected from the group consisting of: a first enveloping volume in fluid flow communication to form part of the first chamber; and a second enveloping volume in fluid flow communication to form part of the second chamber.

According to a further feature of an embodiment of the present invention, the switch inlet port is connected to receive spent brine delivered from an outlet of the reverse osmosis membrane array.

According to a further feature of an embodiment of the present invention, the actuator comprises an actuator piston displaceable within an actuator cylinder.

There is also provided according to the teachings of an embodiment of the present invention, a method for controlling an energy recovery subsystem for use with a reverse osmosis membrane array that receives pressurized fresh brine and generates pressurized spent brine, the energy recovery subsystem including at least one cylinder arrangement comprising: (a) a first cylinder assembly comprising a first hollow cylinder, and a first piston in sliding engagement within the first hollow cylinder so as to at least partially define a first chamber and a second chamber, the first piston having an inner face facing the second chamber and an outer face facing the first chamber, the outer face having larger effective surface area than the inner face for pressure amplification; (b) a second cylinder assembly comprising a second hollow cylinder, and a second piston in sliding engagement within the second hollow cylinder so as to at least partially define a first chamber and a second chamber, the second piston having an inner face facing the second chamber and an outer face facing the first chamber, the outer face having larger effective surface area than the inner face for pressure amplification; (c) at least one piston rod interconnecting the first piston and the second piston; and (d) an arrangement of flow connections configured for directing the pressurized spent brine alternately to the first chamber of the first cylinder assembly so as to act on the first piston, thereby applying amplified pressure to fresh brine within the second chamber for delivery to the reverse osmosis membrane array in a first power stroke, and to the first chamber of the second cylinder assembly so as to act on the second piston, thereby applying amplified pressure to fresh brine within the second chamber for delivery to the reverse osmosis membrane array in a second power stroke, the method comprising the steps of: (i) determining a flow rate of spent brine by monitoring at least one parameter selected from the group consisting of: a position of the first piston, the second piston or the piston rod; a speed of the first piston, the second piston or the piston rod; and an output flow rate of the fresh brine from the first power stroke or the second power stroke; and (ii) adjusting an output pressure of a variable pump affecting a supply pressure for fresh brine for filling the second chamber of the second cylinder arrangement during the first power stroke and for filling the second chamber of the first cylinder arrangement during the second power stroke, thereby providing a working pressure of fresh brine to the reverse osmosis membrane array.

There is also provided according to the teachings of an embodiment of the present invention, an energy recovery subsystem for use with a reverse osmosis membrane array that receives pressurized fresh brine and generates pressurized spent brine, the energy recovery subsystem comprising a master cylinder arrangement and a first slave cylinder arrangement, each of the cylinder arrangements comprising: (a) a first cylinder assembly comprising a first hollow cylinder, and a first piston in sliding engagement within the first hollow cylinder so as to at least partially define a first chamber and a second chamber; (b) a second cylinder assembly comprising a second hollow cylinder, and a second piston in sliding engagement within the second hollow cylinder so as to at least partially define a first chamber and a second chamber; (c) at least one piston rod interconnecting the first piston and the second piston; and (d) a flow selector assuming a first state in which the pressurized spent brine is directed to the first chamber of the first cylinder assembly so as to act on the first piston, thereby applying pressure to fresh brine within the second chamber for delivery to the reverse osmosis membrane array in a first power stroke, and a second state in which the pressurized spent brine is directed to the first chamber of the second cylinder assembly so as to act on the second piston, thereby applying pressure to fresh brine within the second chamber for delivery to the reverse osmosis membrane array in a second power stroke, the energy recovery system further comprising a hydraulic actuator associated with the flow selector of the first slave cylinder arrangement, the hydraulic actuator being in fluid communication with the master cylinder arrangement such that: (i) during the first power stroke of the master cylinder arrangement, pressure from the first power stroke is effective to operate the hydraulic actuator to switch the flow selector of the first slave cylinder arrangement to the first state; and (ii) during the second power stroke of the master cylinder arrangement, pressure from the second power stroke is effective to operate the hydraulic actuator to switch the flow selector of the first slave cylinder arrangement to the second state.

According to a further feature of an embodiment of the present invention, there is also provided a second slave cylinder arrangement comprising: (a) a first cylinder assembly comprising a first hollow cylinder, and a first piston in sliding engagement within the first hollow cylinder so as to at least partially define a first chamber and a second chamber; (b) a second cylinder assembly comprising a second hollow cylinder, and a second piston in sliding engagement within the second hollow cylinder so as to at least partially define a first chamber and a second chamber; (c) at least one piston rod interconnecting the first piston and the second piston; (d) a flow selector assuming a first state in which the pressurized spent brine is directed to the first chamber of the first cylinder assembly so as to act on the first piston, thereby applying pressure to fresh brine within the second chamber for delivery to the reverse osmosis membrane array in a first power stroke, and a second state in which the pressurized spent brine is directed to the first chamber of the second cylinder assembly so as to act on the second piston, thereby applying pressure to fresh brine within the second chamber for delivery to the reverse osmosis membrane array in a second power stroke; and (e) a hydraulic actuator associated with the flow selector of the second slave cylinder arrangement, the hydraulic actuator being in fluid communication with the first slave cylinder arrangement such that: (i) during the first power stroke of the first slave cylinder arrangement, pressure from the first power stroke is effective to operate the hydraulic actuator to switch the flow selector of the second slave cylinder arrangement to the first state; and (ii) during the second power stroke of the first slave cylinder arrangement, pressure from the second power stroke is effective to operate the hydraulic actuator to switch the flow selector of the second slave cylinder arrangement to the second state.

There is also provided according to the teachings of an embodiment of the present invention, a paired cylinder arrangement for use with a reverse osmosis membrane array that receives pressurized fresh brine and generates pressurized spent brine, the cylinder arrangement comprising: (a) a first cylinder assembly comprising: (i) a first hollow cylinder; and (ii) a first piston in sliding engagement within the first hollow cylinder so as to at least partially define a first chamber and a second chamber; (b) a second cylinder assembly comprising: (i) a second hollow cylinder; and (ii) a second piston in sliding engagement within the second hollow cylinder so as to at least partially define a first chamber and a second chamber; (c) a flow selector comprising: (i) a hollow cylinder with regions having first and second internal diameters, the first diameter being larger than the second diameter; (ii) an inlet port in fluid flow connection with the cylinder for an inflow of pressurized spent brine from the reverse osmosis membrane array; (iii) a first outlet port in fluid flow connection with the first chamber of the first cylinder assembly; (iv) a second outlet port in fluid flow connection with the first chamber of the second cylinder assembly; (v) a first seal movable within the cylinder between a first position and a second position; (vi) a second seal movable within the cylinder between a first position and a second position; and (vii) at least one rod interconnecting the first seal and the second seal for simultaneous movement, wherein each of the positions is defined by a step formed by a change in the internal diameter, and wherein the flow selector is operable to assume a first state in which the first seal is in the first position and the second seal is in the second position, thereby allowing the flow of spent brine from the inlet port to the first chamber of the first cylinder assembly, and wherein the flow selector is further operable to assume a second state in which the first seal is in the second position and the second seal is in the first position, thereby allowing the flow of spent brine from the inlet port to the first chamber of the second cylinder assembly.

According to a further feature of an embodiment of the present invention, the first cylinder assembly further comprises a pressure vessel enveloping at least a major part of the first hollow cylinder, the pressure vessel defining at least one enveloping volume selected from the group consisting of: a first enveloping volume in fluid flow communication to form part of the first chamber; and a second enveloping volume in fluid flow communication to form part of the second chamber, and wherein the second cylinder assembly further comprises a pressure vessel enveloping at least a major part of the second hollow cylinder, the pressure vessel defining at least one enveloping volume selected from the group consisting of: a first enveloping volume in fluid flow communication to form part of the first chamber; and a second enveloping volume in fluid flow communication to form part of the second chamber.

BRIEF DESCRIPTION OF THE DRAWINGS

The invention is herein described, by way of example only, with reference to the accompanying drawings, wherein:

FIG. 1B is a close-up view of a paired cylinder arrangement according to an embodiment of the invention;

FIG. 2A is a schematic diagram showing a reverse osmosis membrane array in operation with a paired cylinder arrangement including a hydraulic switch and flow selector with hydraulic actuator according to an embodiment of the invention;

FIG. 2B is a close-up view of a paired cylinder arrangement including a hydraulic switch and flow selector with hydraulic actuator according to an embodiment of the invention;

DESCRIPTION OF THE PREFERRED EMBODIMENTS

The preset invention is a cylinder arrangement and method of use for providing a functionality for energy recovery with seawater desalination.

The principles and operation of a cylinder arrangement and method of use according to the present invention may be better understood with reference to the drawings and the accompanying description.

Figure 1A:
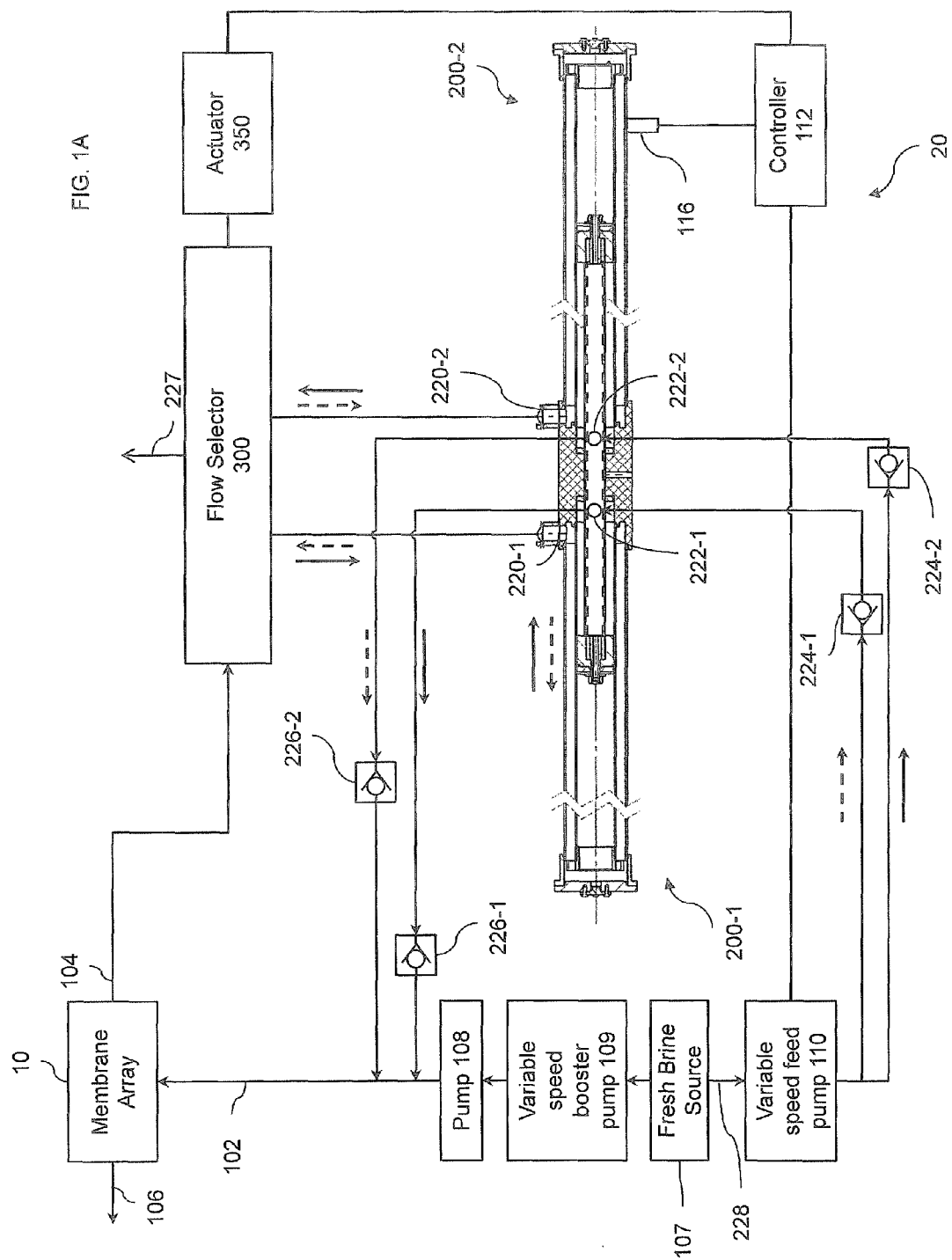
FIG. 1A is a schematic diagram showing a reverse osmosis membrane array in operation with a paired cylinder arrangement according to an embodiment of the invention.

Referring now to FIG. 1A of the drawings, a reverse osmosis membrane array 10 for desalination of seawater is shown which includes a fresh brine inlet 102, a spent brine outlet 104, and a fresh water outlet 116. Fresh brine from a source of salt water, represented schematically by block 107, is supplied to fresh brine inlet 102 by a high pressure pumping system which includes at least one high pressure pump 118 and a variable speed booster pump 109. Booster pump 109, typically operating at a pressure of 4-16 bar, works together with high pressure pump 118 to bring the fresh brine to a chosen working pressure at which reverse osmosis membrane array 10 is to be operated to desalinate the fresh brine. Typical reverse osmosis systems are implemented as an array of semi permeable membrane units. Water passes through semipermeable membranes in reverse osmosis membrane array 10 and is discharged from fresh water outlet 106. Concentrated salt water, or "spent brine", is simultaneously discharged from spent brine outlet 104 at a pressure slightly lower than the inlet pressure. The reverse osmosis membrane array does not, in itself, constitute part of the present invention, and will not be described here in further detail.

A cylinder arrangement 20 is also shown in FIGS. 1A-1B. Major elements of cylinder arrangement 20 preferably include first and second hollow cylinders 204-1 and 204-2. Cylinders 204-1 and 204-2 have an interior surface defining an interior volume and are open at a single end 206-1 and 206-2. Hollow cylinders 204-1 and 204-2 are preferably positioned inside of respective pressure vessels 202-1 and 202-2 which lowers the pressure differential across the walls cylinders 204-1 and 204-2. The envelopment of cylinders 204-1 and 204-2 by respective pressure vessels 202-1 and 202-2 defines enveloping volumes in the respective spaces between cylinders 204-1 and 204-2 and pressure vessels 202-1 and 202-2. It is preferable that substantially the entirety of the surface area of cylinders 214-1 and 204-2 is enveloped by respective pressure vessels 202-1 and 212-2. In this configuration, the entire surface areas of cylinders 204-1 and 204-2 are exposed to high pressure from within respective pressure vessels 202-1 and 202-2. This allows for cylinders 204-1 and 204-2 to be made from a lower cost and/or thinner material chosen for its dimensional stability and wear resistance. Particularly preferred materials include stainless steel, composite materials and various polymer materials. Although the depiction of pressure vessels 202-1 and 212-2 in FIGS. 1A-1B shows a cylindrical shape with flat ends, other suitable shapes can be used, such as, for example, a tubular shape with hemispherical ends. Pressure vessels 202-1 and 202-2 are made of a material or combination of materials suitable for withstanding high pressure differentials including, but not limited to, steel and composite materials.

Each cylinder 204-1 and 204-2 contains a reciprocally movable piston 208-1 and 208-2 for moving within the respective internal surfaces of cylinders 204-1 and 204-2. Pistons 208-1 and 208-2 have inner faces 210-1 and 210-2 and outer faces 212-1 and 212-2. Pistons 208-1 and 208-2 effectively subdivide the internal volumes of cylinders 204-1 and 204-2 into volumes forming a part of spent brine chambers 216-1 and 216-2 and volumes forming a part of fresh brine chambers 214-1 and 214-2. Preferably, outer faces 212-1 and 212-2 are of larger effective surface area than inner faces 210-1 and 210-2. This difference in the effective surface area provides pressure amplification so that a given pressure of spent brine introduced into chamber 216-1 or 216-2 results in a somewhat higher output pressure of fresh brine from the corresponding chamber 214-1 or 214-2. The cylinder arrangement of hollow cylinders 204-1 and 204-2 inside of respective pressure vessels 202-1 and 202-2 are hereinafter referred to as cylinder arrangements 200-1 and 200-2. It is preferable that cylinder arrangements 200-1 and 200-2 are connected by a mechanical arrangement, thereby creating a paired cylinder arrangement, as detailed further below.

Spent brine inlet-outlet ports 220-1 and 220-2 are here implemented as connections to pressure vessels 202-1 and 202-2. An additional advantage of the double cylinder arrangements 200-1 and 200-2 is that inlet-outlet ports 220-1 and 220-2 may be placed far from respective open ends 206-1 and 206-2. This allows for the grouping of spent brine inlet-outlet ports near the center of the cylinder arrangement 20 as shown in FIGS. 1A-1B. This grouping facilitates the reduction of the length of high pressure pipes and minimizes the connection reliability issues caused by the expansion and contraction along the length of pressure vessels 202-1 and 202-2. Furthermore, the use of double cylinder arrangements ensures that the pressure vessels themselves are not subject to mechanical wear from the moving pistons.

Although the configuration shown here in which the spent brine chamber extends around the inner cylinder, a similar reduction of the pressure differential across the walls of cylinders 204-1 and 204-2 may be achieved by extending fresh brine chambers 214-1 and 214-2 to envelope some or all of the exterior of respective cylinders 204-1 and 204-2. Where the enveloping volume is provided in part by the spent brine chamber and in part by the fresh brine chamber, a relatively narrow dividing wall (not shown) is provided to seal around the inner cylinder and subdivide the enveloping volume.

It is most preferable that the aforementioned mechanical arrangement is implemented using at least one connecting rod 218 connected to pistons 208-1 and 208-2 for simultaneous movement. Rod 218 preferably interconnects pistons 208-1 and 208-2 at inner faces 210-1 and 210-2. Rod 218 extends through an aperture or apertures in a central body separating cylinder arrangements 200-1 and 200-2. Due to the pressure difference between the fresh brine and the spent brine, leakage of spent brine from chambers 216-1 and 216-2 into the fresh brine in chambers 214-1 and 214-2 is typically avoided. Nevertheless, pistons 208-1 and 208-2 preferably include a structure, such as a seal ring or the like, which prevents mixing in either direction between fresh brine in fresh brine chambers 214-1 and 214-2 and spent brine in chambers 216-1 and 216-2. Pistons 208-1 and 208-2 may be described as moving between first and second extreme positions. The first position of piston 208-1 is preferably adjacent open end 206-1 of cylinder 204-1, while the first position of piston 208-2 is preferably adjacent open end 206-2 of cylinder 204-2. The second position of piston 208-1 is preferably adjacent inlet-outlet port 220-1, while the second position of piston 208-2 is preferably adjacent inlet-outlet port 220-2. The movement of pistons 208-1 and 208-2 from their respective first positions to second positions is referred to as the pressure stroke of pistons 208-1 and 208-2. The movement of pistons 208-1 and 208-2 from their respective second positions to first positions is referred to as the reverse stroke of pistons 208-1 and 208-2. It is apparent that the pressure stroke of piston 208-1 coincides with the reverse stroke of piston 208-2, and that the pressure stroke of piston 208-2 coincides with the reverse stroke of piston 208-1.

Although the use of one or more common piston rod rigidly linking pistons 208-1 and 208-2 is a particularly preferred implementation used throughout the description, it should be noted that other forms of mechanical linkage between the pistons to ensure simultaneous and opposite motion may also be used. Such options may be of particular value where a compact side-by-side deployment of the pair of cylinders is preferred to the coaxial arrangement illustrated herein. Such mechanical linkages can readily be implemented using a lever arms configuration with pivotally mounted drive rods linked to the pistons.

Fresh brine inlet-outlet ports 222-1 and 222-2 are provided in fresh brine chambers 214-1 and 214-2. Fresh brine inlet-outlet ports 222-1 and 222-2 are in fluid flow connection with a source of fresh brine 107 and with fresh brine inlet 102. For use with reverse osmosis membrane array 10, the spent brine acts as the operating fluid for driving pistons 208-1 and 208-2. The spent brine is alternatingly supplied to inlet-outlet ports 220-1 and 220-2 through spent brine conduit outlet 104 and a flow selector 300. Flow selector 300 may be a valve arrangement connected to an actuator 350. Actuator 350 is preferably connected to a controller 112 which is associated with sensors (illustrated schematically as a sensor 116) for sensing the positions of piston 208-1 and/or piston 208-2. The sensors may include transducers or the like located adjacent to the first and second positions of piston 208-1 and/or piston 208-2, or various other linear encoder or position sensor arrangements for sensing the position of the pistons or piston rods. Sensing the positions of pistons 208-1 and 208-2 is preferably used for timing the stroke reversal of cylinder arrangements 200-1 and 200-2, i.e. the change from pressure stroke to reverse stroke of cylinder arrangement 210-1 and the simultaneous change from reverse stroke to pressure stroke of cylinder arrangement 200-2, and vice versa. Flow selector 300 controls the inflow and outflow of spent brine to and from inlet-outlet ports 220-1 and 220-2 as actuated by actuator 350. Spent brine is discharged from spent brine chambers 216-1 and 216-2 through flow selector 300 and a discharge conduit 227 connected to a spent brine dump or the like. Typically, the body of water from which the seawater is drawn, e.g. the ocean, also acts as the spent brine dump, with suitable spacing between the inlet and outlet. Fresh brine to be pumped to reverse osmosis membrane array 10 is alternatingly supplied to inlet-outlet ports 222-1 and 222-2 through a supply conduit 228 from the source of fresh brine. Supply conduit 228 is preferably in fluid flow connection with a pump 110. Pump 110 provides a supply of fresh brine alternatingly to fresh brine chambers 214-1 and 214-2. Fresh brine is supplied to, and pumped out of, fresh brine chambers 214-1 and 214-2 through a fresh brine flow selector arrangement which, in the implementation of FIGS. 1A-1B, is an arrangement of check valves deployed to define the flow paths for inflow and outflow of fresh brine to and from fresh brine chambers 214-1 and 214-2. The arrangement of check valves includes check valves 224-1, 224-2, 226-1 and 226-2. When piston 208-1 moves to the right as illustrated in FIGS. 1A-1B, the pressure in fresh brine chamber 214-1 is raised to the working inlet pressure required for the reverse osmosis membrane array 10, typically of the order of 70 bar, maintaining check valve 224-1 closed and preventing the flow of fresh brine back to pump 110. Simultaneously, check valve 226-1 opens to allow the flow of high-pressure fresh brine to inlet 102 of reverse osmosis membrane array 10. Although described thus far in an implementation using an arrangement of check valves for controlling the inflow and outflow of fresh brine to and from fresh brine chambers 214-1 and 214-2, other embodiments are possible in which a valve arrangement (not shown) controls the inflow and outflow of fresh brine. In such embodiments, the valve may be actuated by actuator 350 to ensure synchronization between the inflow/outflow of fresh brine with the inflow/outflow of spent brine.

The operation of the system as shown in FIGS. 1A-1B will now be described. Fresh brine from source 107 is supplied to booster pump 109 which subsequently supplies the fresh brine to high pressure pump 108 and from there to reverse osmosis membrane array 10, which generates an output of desalinated water 106 and an outflow of spent concentrated brine 104. Flow selector 300 directs this flow alternately to one of spent brine chambers 216-1 and 216-2 while low pressure spent brine is drained from the other spent brine chamber via flow selector 300 to spent brine discharge conduit 227. According to the flow paths illustrated by solid arrows in FIG. 1A, high pressure spent brine is currently being delivered to chamber 216-1, thereby driving piston 208-1 to the right as shown and delivering fresh brine from chamber 214-1 at high pressure via outlet 220-1 and check valve 226-1 to form part of the intake of reverse osmosis membrane array 10. The power-stroke motion of piston 208-1 is also conveyed via piston rod(s) 218 to displace piston 208-2, thereby simultaneously expelling the spent brine introduced to chamber 216-2 during the previous power stroke via selector 300 to spent brine discharge conduit 227 and drawing in fresh brine, typically supplied via variable speed low pressure pump 110 and check valve 224-2, to fill chamber 214-2.

When piston 201-1 nears the second position, the position of piston 208-1 and/or piston 208-2 are sensed via the position sensors or the like and controller 112 sends a control signal to actuator 350 to actuate flow selector 30$f$ to change the inflow and outflow of spent brine to and from spent brine inlet-outlet ports 220-1 and 220-2. In such an arrangement, flow selector 311 is preferably actuated prior to piston 208-1 reaching the limit of its range of motion, thereby minimizing any momentary dead time which may occur during the direction reversal, and any consequent fluctuation in the output flow rate from the cylinder arrangement. After actuation of flow selector 300, fluid connections to and from cylinder arrangements 200-1 and 200-2 are reversed whereby spent brine from reverse osmosis membrane array 10 is supplied to spent brine chamber 216-2 to drive interconnected pistons 208-1 and 208-2 such that piston 208-2 moves from its first position towards its second position. Fresh brine from fresh brine chamber 214-2 is pumped through inlet-outlet port 222-2 as part of the input to reverse osmosis membrane array 10. Fresh brine from the fresh brine source is supplied to fresh brine chamber 214-1 through inlet-outlet port 222-1. Spent brine is discharged from spent brine chamber 216-1 through open end 206-1 of cylinder 204-1 and inlet-outlet port 220-1. When piston 208-2 nears its second position and piston 208-1 nears its first position, the position of piston 208-1 and/or piston 208-2 are sensed via the position sensors or the like and controller 112 sends a control signal to actuator 350 to actuate flow selector 300 to change the inflow and outflow of spent brine to and from spent brine inlet-outlet ports 220-1 and 220-2 as shown in the illustrated first position. The energy recovery cycle is thus repeated.

Parenthetically, although illustrated herein in one particularly preferred implementation as a tube-like selector, flow selector 300 may be implemented in any of a number of configurations. By way of one additional non-limiting example, a rotary selector may be used in which arcuate channels alternately connect the high pressure spent brine connection and the spent brine drain connection which each of the pressurized brine drive-stroke chambers of the cylinder arrangements.

In certain preferred implementations, it may be preferable to implement the sensing and actuation process for reversing the direction of pistons 208-1 and 208-2 using a reduced number of number electro-mechanical components.

In certain such cases, it is preferred that flow selector 300 and actuator 350 are operated by a hydraulic switching arrangement without requiring additional sensors or electronic actuators.

According to certain preferred embodiments, flow selector 300 is hydraulically actuated and includes a hollow flow selector cylinder assembly 301 which extends between first and second ends 302-1 and 302-2, and which is typically assembled from a number of different cylindrical and branched sections, as discussed below. With reference to FIGS. 2A-3B, selector 300 as illustrated here has a high-pressure spent brine inlet port 304 in fluid flow connection with spent brine outlet 104, and first and second spent brine drainage outlet ports 306-1 and 306-2 in fluid flow connection with discharge conduit 227 (FIG. 1$a$). First and second spent brine inlet-outlet ports 307-1 and 307-2 are in fluid flow connection with spent brine inlet-outlet ports 220-1 and 221-2 respectively.

According to certain particularly preferred implementations, flow selector 300 is integrated with a hydraulic actuator 350. In this case, at one end of the selector, an integrated hydraulic actuator arrangement 350 includes a piston 308 displaceable within an actuator cylinder portion 309 so as to displace a selector rod 316 (which may be assembled from a number of separable sections, as shown) between first and second positions within cylinder assembly 301. Piston 308 has an inner face 310 and an outer face 312. It is preferred that piston 308 includes a structure, such as a seal ring or the like, sealing against the wall of cylinder portion 309. Cylinder portion 309 is delineated by first and second non-moveable seals 305-1 and 305-2. The volume between second non-moveable seal 305-2 and outer face 312 is referred to as first volume 303-1. The volume between inner face 310 and first non-moveable seal 305-1 is referred to as second volume 343-2. Piston 308 has a first position preferably adjacent to second non-moveable seal 305-2. Piston 308 has a second position preferably adjacent to first non-moveable seal 315-1.

Optionally, selector 301 may include an extension portion 318 within which moves an extension rod 320, interconnected so as to move together with selector rod 316. Provision of extension rod 320 equalizes the effective surface area on both sides of the piston 308, and provides a convenient location for a sensor for sensing the current state of selector 300 as an input to the control system. It should be noted, however, the extension rod 320 is not essential, and an asymmetry between the surface areas on the two sides of piston 348 is generally not considered problematic.

Figure 3A:
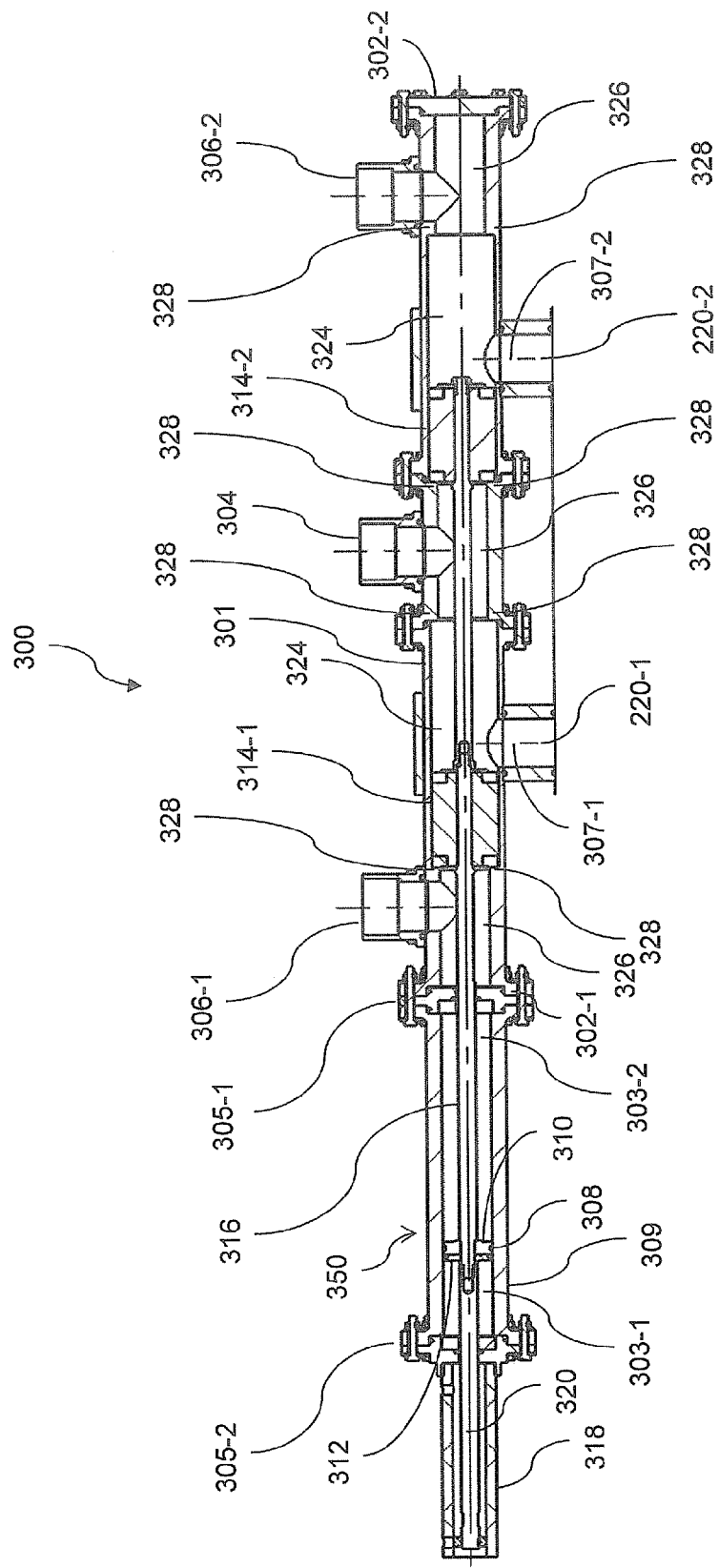
FIG. 3A is a cross-sectional view of a flow selector according to an embodiment of the invention.

In the preferred implementation illustrated here, cylinder assembly 311 contains first and second reciprocally movable seals 314-1 and 314-2 for moving within cylinder assembly 301. Movable seals 314-1 and 314-2 may have a piston-like structure, although axially-closing seals are preferred to radially sliding seals, as detailed below with reference to FIG. 3b. Seal 314-1 has a first position preferably interposed between outlet port 306-1 and inlet-outlet port 307-1. Seal 314-1 has a second position preferably interposed between inlet-outlet port 307-1 and inlet port 304. Seal 314-2 has a first position preferably interposed between outlet port 306-2 and inlet-outlet port 307-2. Seal 314-2 has a second position preferably interposed between inlet-outlet port 307-2 and inlet port 304. Piston 308 and seals 314-1 and 314-2 are interconnected for simultaneous movement. Selector rod 316 interconnects piston 308 and seals 314-1 and 314-2. Selector rod 316 extends through apertures in non-moveable seals 305-1 and 305-2. Preferably, a seal ring or the like at the apertures of non-moveable seals 305-1 and 305-2 provides a sealing engagement between rod 316 and non-moveable seals 305-1 and 305-2 while allowing for axial movement of rod 316. As mentioned above, selector rod 316 may be formed from multiple bodies, with each body interconnecting different components of flow selector 300. For example, a first body of rod 316 may be used to connect to outer face 312 of piston 308. A second body of rod 316 may then be used to interconnect inner face 310 of piston 308 and seal 314-1. A third body of rod 316 may then be used to interconnect seals 314-1 and 314-2. The movement of piston 308 displacing rod 316 acts as a hydraulic actuator. The simultaneous movement of pistons 308 and seals 314-1 and 314-2 effects the transitioning of flow selector 300 between first and second states. When seal 314-1 is in its first position and seal 314-2 is in its second position as shown in FIGS. 2A, 2B and 3A, flow selector 30 is in a first state. Likewise, when seal 314-1 is in its second position and seal 314-2 is in its first position, flow selector 300 is in its second state. When flow selector 300 is in the first state, spent brine from reverse osmosis membrane array 10 is supplied to spent brine chamber 216-1 through inlet port 304, inlet-outlet port 307-1, inlet-outlet port 220-1, and open end 206-1 of cylinder 204-1. Simultaneously, spent brine is discharged from spent brine chamber 216-2 through open end 206-2 of cylinder 204-2, inlet-outlet port 220-2, inlet-outlet port 307-2, outlet port 306-2, and discharge conduit 227 to the spent brine dump (the sea). When flow selector 300 is in the second state, spent brine from reverse osmosis membrane array 10 is supplied to spent brine chamber 216-2 through inlet port 304, inlet-outlet port 307-2, inlet-outlet port 220-2, and open end 206-2 of cylinder 204-2. Simultaneously, spent brine is discharged from spent brine chamber 216-1 through open end 206-1 of cylinder 204-1, inlet-outlet port 220-1, inlet-outlet port 307-1, outlet port 306-1, and discharge conduit 227 to spent brine dump.

Figure 3B:
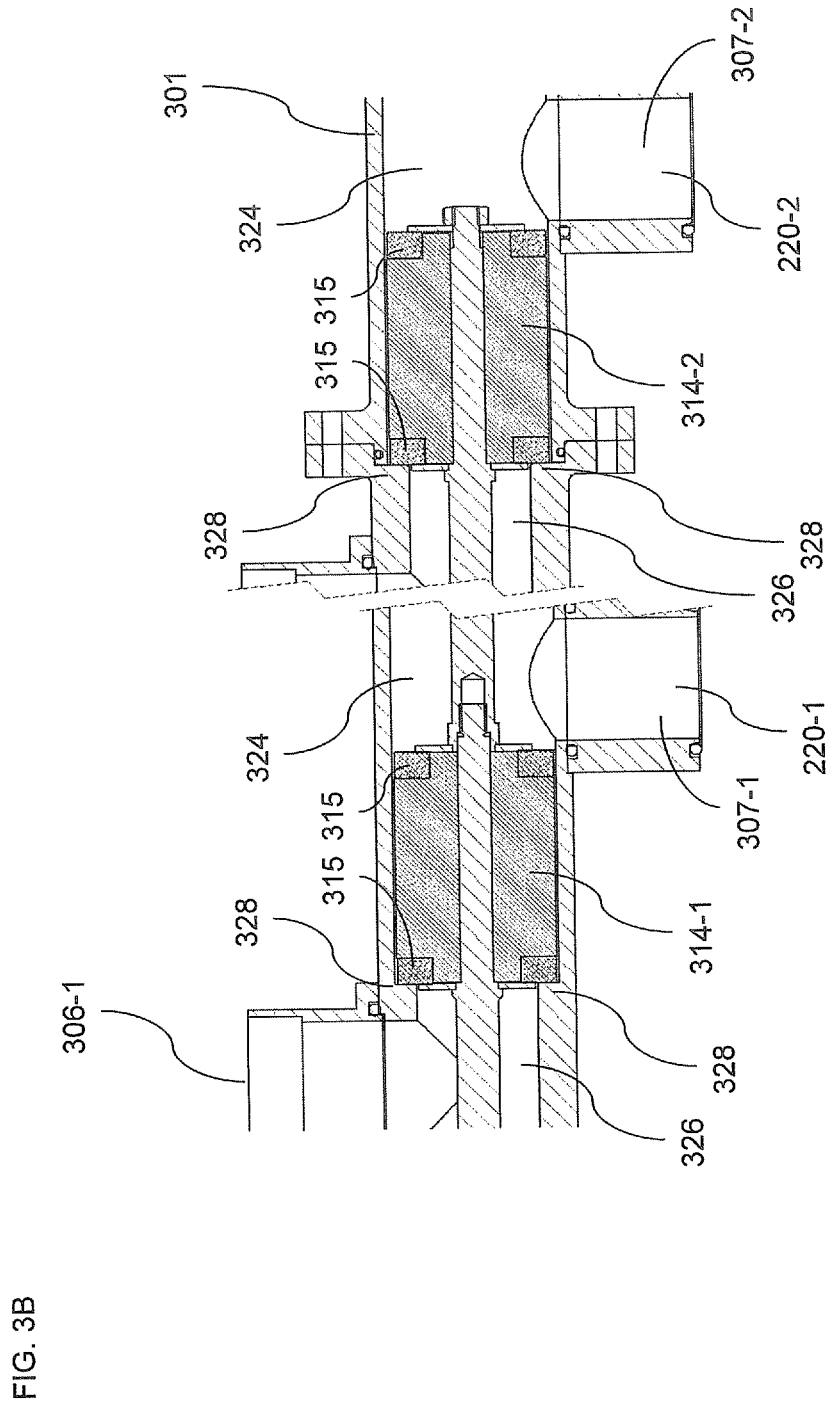
FIG. 3B is a close-up view of a flow selector according to an embodiment of the invention.

According to a particularly preferred implementation illustrated here, corresponding to a further aspect of the present invention application to flow selectors, the sealing surfaces of sliding seals 314-1 and 314-2 are provided on axially facing closure surfaces of the sliding seals rather than by using radial seals bearing on the inside of a cylinder. Specifically, hollow cylinder assembly 301 is shown here with sections having two differing internal diameters, namely sections 324 having a first internal diameter and sections 326 having a second internal diameter, where the first internal diameter is larger than the second internal diameter. The locations within hollow cylinder assembly 301 in which changes of internal diameter occur form a plurality of steps 328 defining the first and second positions of seals 314-1 and 314-2. As shown in FIGS. 3A-3B, seals 314-1 and 314-2 are movable within the sections 324 of cylinder assembly 301 having the first diameter and have annular sealing rings 315 on the axially-facing end surfaces of the seals configured for sealing against steps 328, thereby defining the flow paths of the spent brine through flow selector 300 as previously described. By avoiding use of outwardly-pressing seals against the inner surface of cylinder assembly 301, problems of reliability due to wear of seals 314-1 and 314-2 passing over lateral openings 220-1 and 220-2 are greatly reduced.

According to certain preferred embodiments, the hydraulic actuator of flow selector 300 is actuated by a hydraulic switch 400. According to certain particularly preferred implementations illustrated here, hydraulic switch 400 is mechanically integrated with cylinder arrangement 20 so as to be actuated towards the end of each stroke of piston 208-1 or 208-2. It should be noted that the use of a hydraulic switch 400 to trigger operation of an actuator 350 which causes a change in state of flow selector 300 offers significant advantages over direct actuation of a flow selector by motion of the pistons. Most notably, since no change in state of selector 300 occurs until after the state of hydraulic switch 400 has been completely reversed, potential issues of "stalling" at some intermediate position during the state reversal are avoided.

Figure 4:
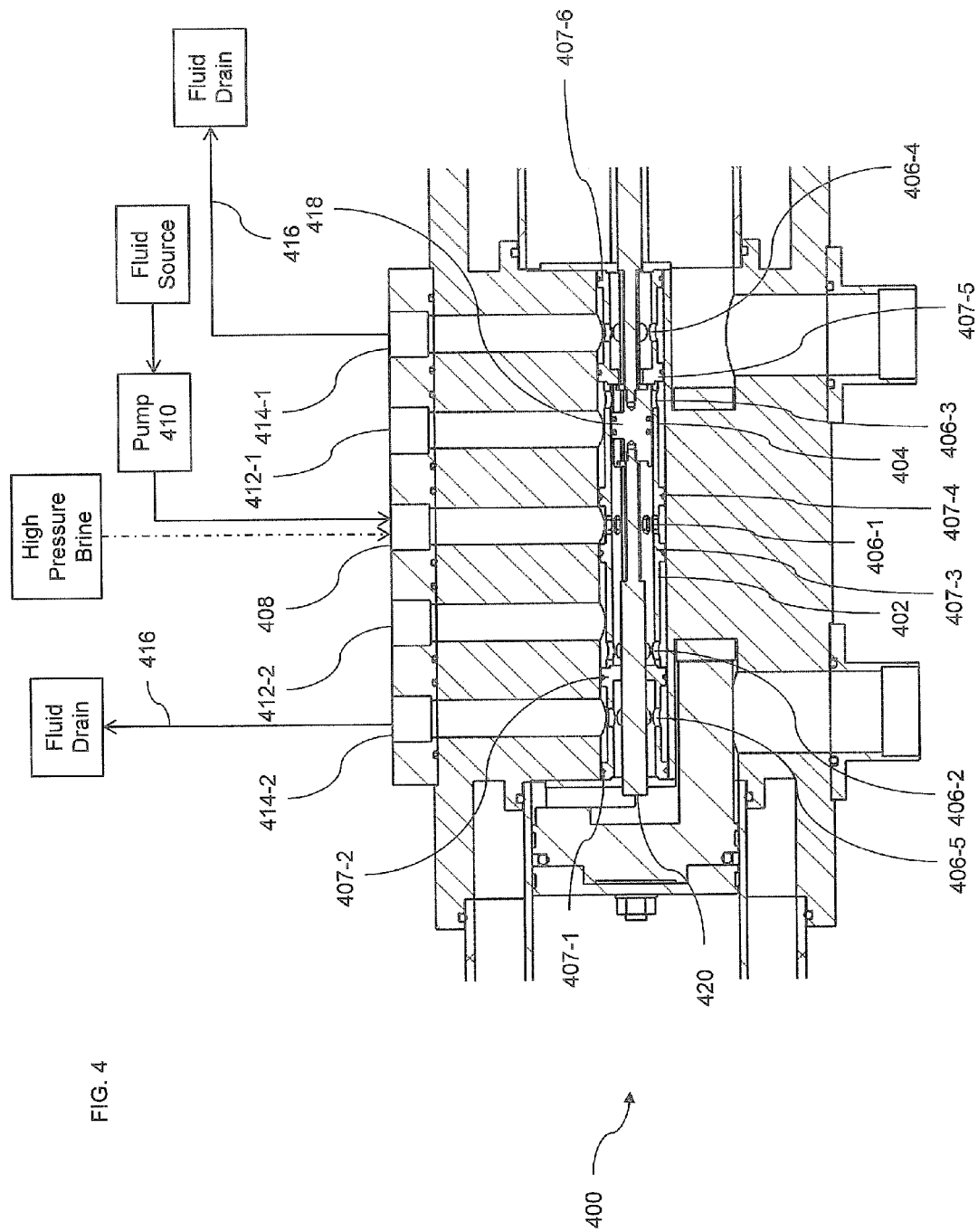
FIG. 4 is a cross-sectional view of a hydraulic switch according to an embodiment of the invention.
Figure 5A:
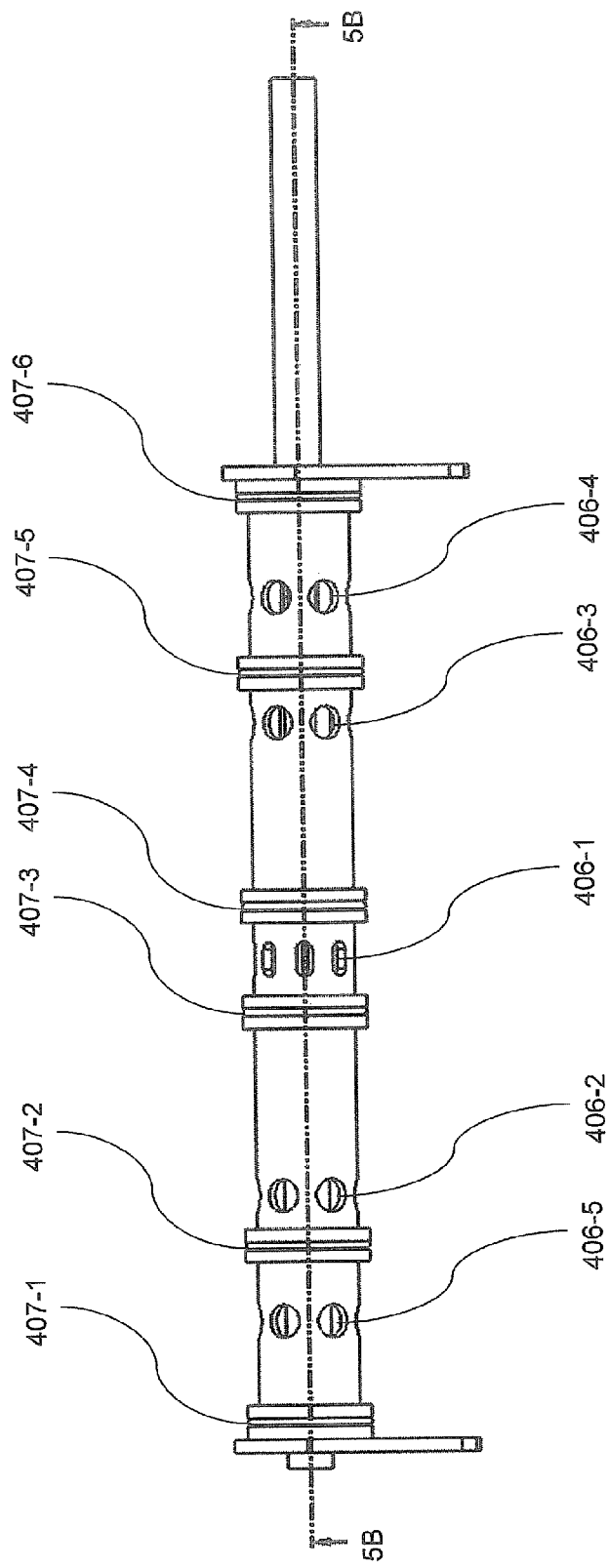
FIG. 5A is a view of some of the elements of a hydraulic switch according to an embodiment of the invention.
Figure 5B:
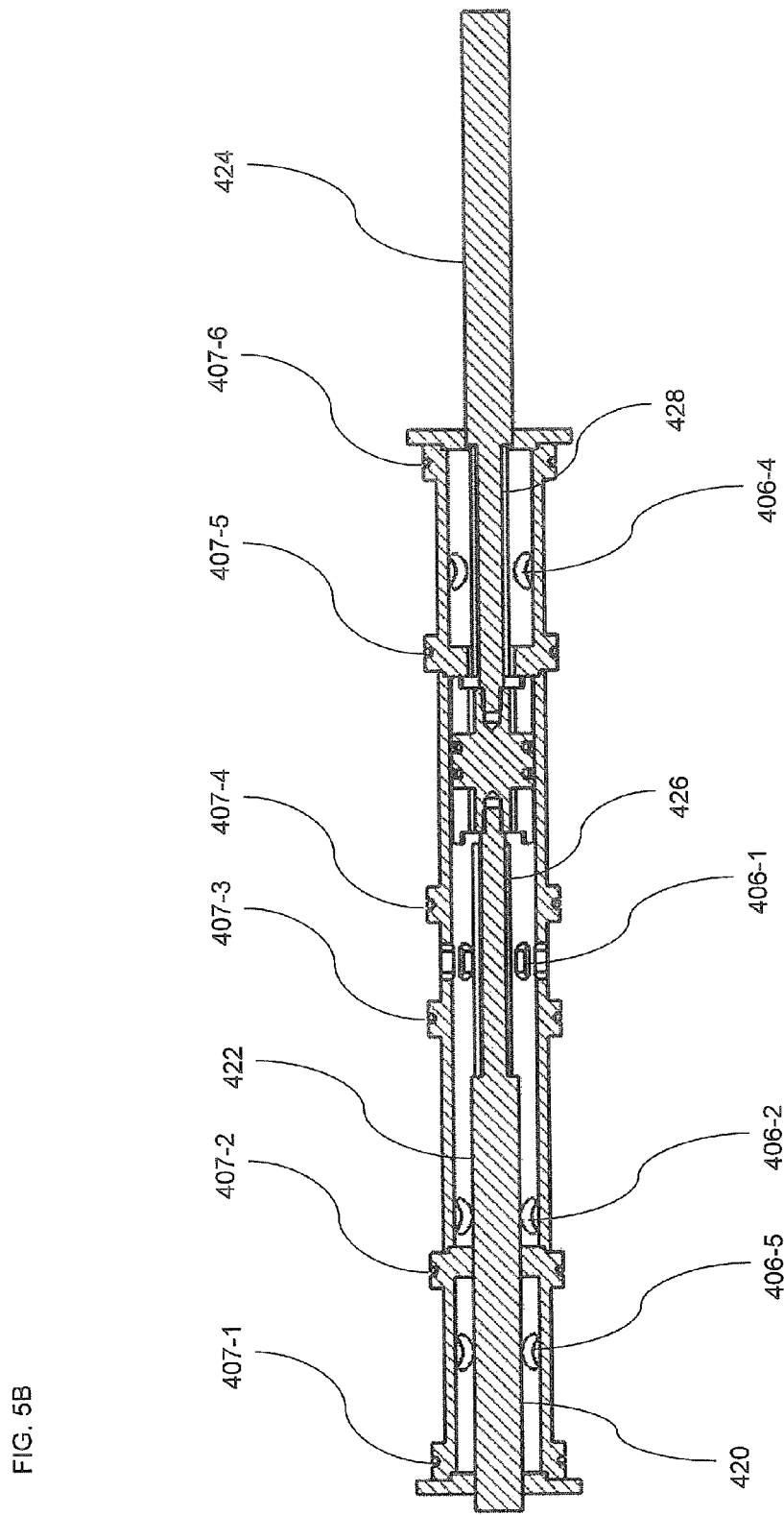
FIG. 5B is a cross-sectional view of elements of a hydraulic switch according to an embodiment of the invention.

Referring now to FIGS. 2A-2B, 4, 5A-5B and 6A-6C, one particularly preferred implementation of hydraulic switch 400 as illustrated here includes a hollow hydraulic switch chamber 402 with a chamber wall 404 having first and second ends. Preferably, chamber wall 404 includes a first at least one aperture 406-1, a second at least one aperture 406-2, a third at least one aperture 406-3, a fourth at least one aperture 406-4, and a fifth at least one aperture 406-5. Apertures 406-1, 406-2, 406-3, 406-4 and 406-5 are preferably arranged annularly around chamber wall 404 as depicted in FIGS. 4, 5A and 5B. Chamber wall 404 preferably includes a first switch non-moveable seal 407-1, a second switch non-moveable seal 407-2, a third switch non-moveable seal 407-3, a fourth switch non-moveable seal 407-4, a fifth switch non-moveable seal 407-5, d sixth switch non-moveable seal 407-6. The preferred interposed arrangement of the apertures and non-movable seals is as shown in FIGS. 5A-5B. The first end of chamber wall 411-1 is adjacent seal 417-1, and second end of chamber wall 404 is adjacent seal 407-6.

A hydraulic fluid inlet port 408 is provided adjacent to aperture 406-1. Pressurized hydraulic fluid, which may be an oil or may be high or low pressurized brine taken from some suitable point in the system, is supplied to inlet port 408 from a hydraulic fluid source. The hydraulic fluid is preferably pressurized to at least 5 bar. Where a dedicated hydraulic fluid is used, the fluid is pressurized by a suitable device, such as a pressure supply pump 410 or the like. First and second actuator control inlet-outlet ports 412-1 and 412-2 are provided adjacent to apertures 406-3 and 406-2 respectively. Inlet-outlet port 412-1 is in fluid flow connection with outer face 312 of flow selector piston 301. Inlet-outlet port 412-2 is in fluid flow connection with inner face 310 of flow selector piston 308. First and second hydraulic fluid drain outlet ports 414-1 and 414-2 are provided adjacent apertures 406-4 and 406-5 respectively. Outlet ports 414-1 and 414-2 are preferably in fluid flow connection with a hydraulic fluid discharge conduit 416 connected to a hydraulic fluid dump which, in the case of an oil based hydraulic system, is typically the reservoir supplying pump 410. Chamber 402 contains a reciprocally movable switching seal 418 for moving within chamber wall 404. It is preferred that seal 418 has a piston like structure. Switching seal 418 has a first position preferably adjacent inlet-outlet port 412-1 and a second position preferably adjacent inlet-outlet port 412-2. Seal 418 is shown here integrated with a switching rod 420 for movement within chamber wall 404. As shown in FIG. 5B, rod 420 is also integrated with narrow 426, 428 and wide 422, 424 diameter sections. Wide diameter sections 422 and 424 act as sliding seals within chamber 402. When seal 418 is in its first position, seal 422 prevents the flow of hydraulic fluid from aperture 406-1 to aperture 406-5, thus preventing the flow from inlet port 408 to outlet port 414-2. When seal 418 is in its second position, seal 424 prevents the flow of hydraulic fluid from aperture 406-1 to aperture 406-4, thus preventing the flow from inlet port 40 to outlet port 414-1. Chamber 402 is preferably interposed between fresh brine chambers 214-1 and 214-2. Seal 422 preferably extends out of the first end of chamber 402 through an aperture when seal 418 is in the second position. Likewise, seal 424 extends through the second end of chamber 402 when seal 418 is in the first position. Thus, rod 420 is moved by contact with pistons 201-1 and 208-2 towards the end of their range of motion. The relative positioning of apertures and switch seals dictates the possible flow paths the hydraulic fluid can traverse through inlet port 408, inlet-outlet ports 412-1 and 412-2, and outlet ports 414-1 and 414-2. The movement of switching seal 411 achieves switching of hydraulic switch 400 between first and second states.

When hydraulic switch 400 is in the first state, pressurized hydraulic fluid from a hydraulic fluid source is supplied to volume 303-2 of cylinder assembly 311 through inlet-outlet port 412-1, aperture 406-3, aperture 406-1, and inlet port 418. Simultaneously, hydraulic fluid is discharged from volume 303-1 through inlet-outlet port 412-2, aperture 406-2, aperture 406-5, outlet port 414-2 and hydraulic fluid discharge conduit 416 connected to a hydraulic fluid dump. When hydraulic switch 400 is in the second state, pressurized hydraulic fluid from a hydraulic fluid source is supplied to volume 303-1 of cylinder assembly 301 through inlet-outlet port 412-2, aperture 406-2, aperture 406-1, and inlet port 408. Simultaneously, hydraulic fluid is discharged from volume 303-2 through inlet-outlet port 412-1, aperture 406-3, aperture 406-4, outlet port 414-1 and hydraulic fluid discharge conduit 416 connected to a hydraulic fluid dump.

As noted, hydraulic switch is interposed between pistons 208-1 and 208-2 such that pistons 208-1 and 208-2 move switching rod 420 back and forth. The arrangement preferably operates as a bistable "flip-flop" where, as seal 418 passes the central position of switch 400 in either direction, pressure from the pressure source carries the seal 418 and its associated switching rod 420 quickly to the end of its motion, thereby triggering the change of state of actuator 350 and hence of selector 300. This arrangement is effective to avoid the risk f stalling of the cylinder arrangement in any "dead" intermediate state during switching from pressure stroke to reverse stroke and vice versa.

Although the switching arrangement described thus far has pertained to a hydraulic switch using a hydraulic fluid such as oil or the like for driving the hydraulic switch, other embodiments are possible in which the hydraulic fluid used to drive hydraulic switch 400 is the pressurized brine. The pressurized brine may be from a variety of sources, such as the pressurized fresh brine from high pressure pump 108 before introduction to reverse osmosis membrane array 10, the pressurized fresh brine from inlet-outlet ports 222-1 and/or 222-2, or pressurized spent brine.

Figure 6A:
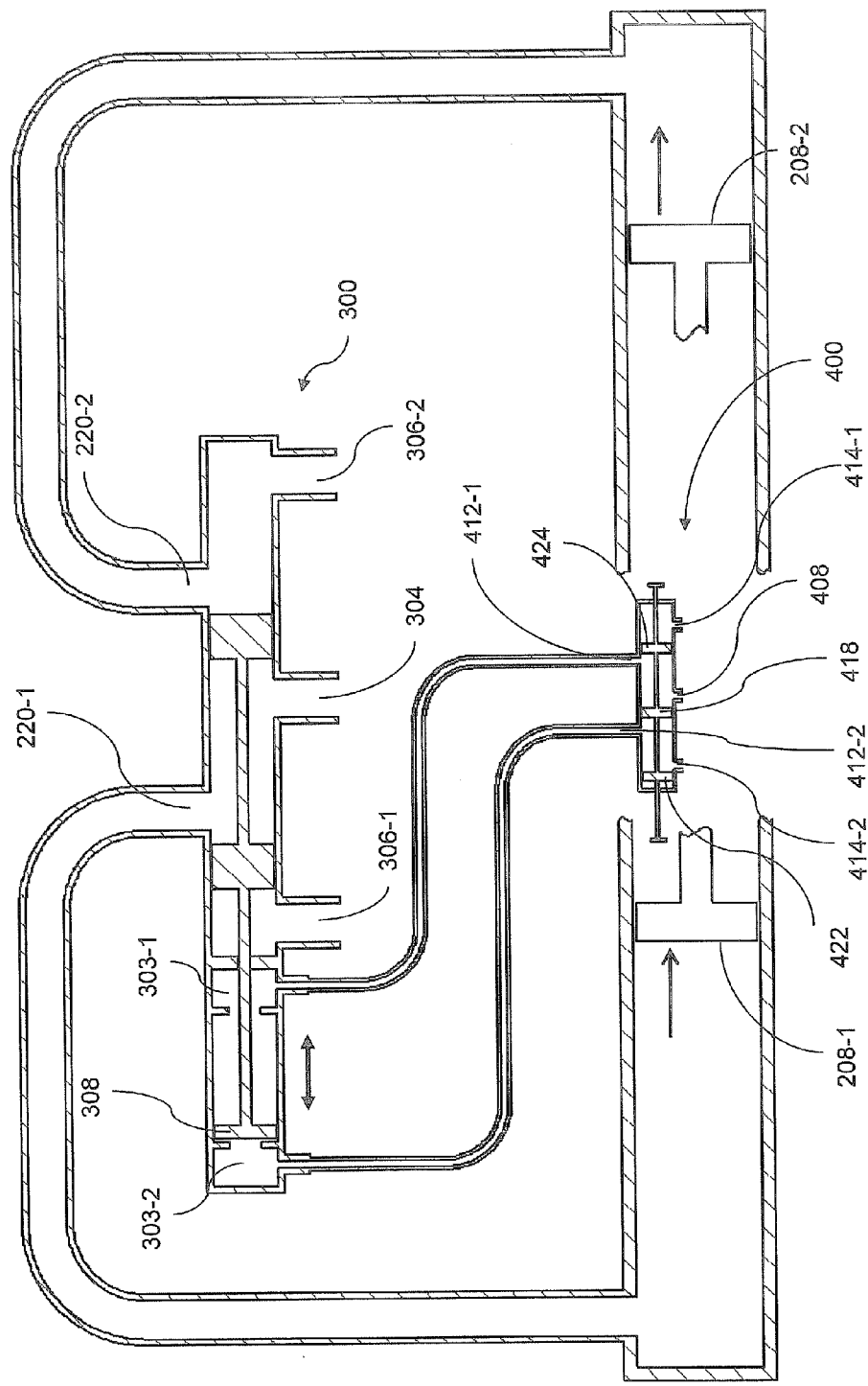
FIGS. 6A-6C show a schematic diagram of the state transitions of a flow selector and a hydraulic switch according to an embodiment of the invention.
Figure 6B:
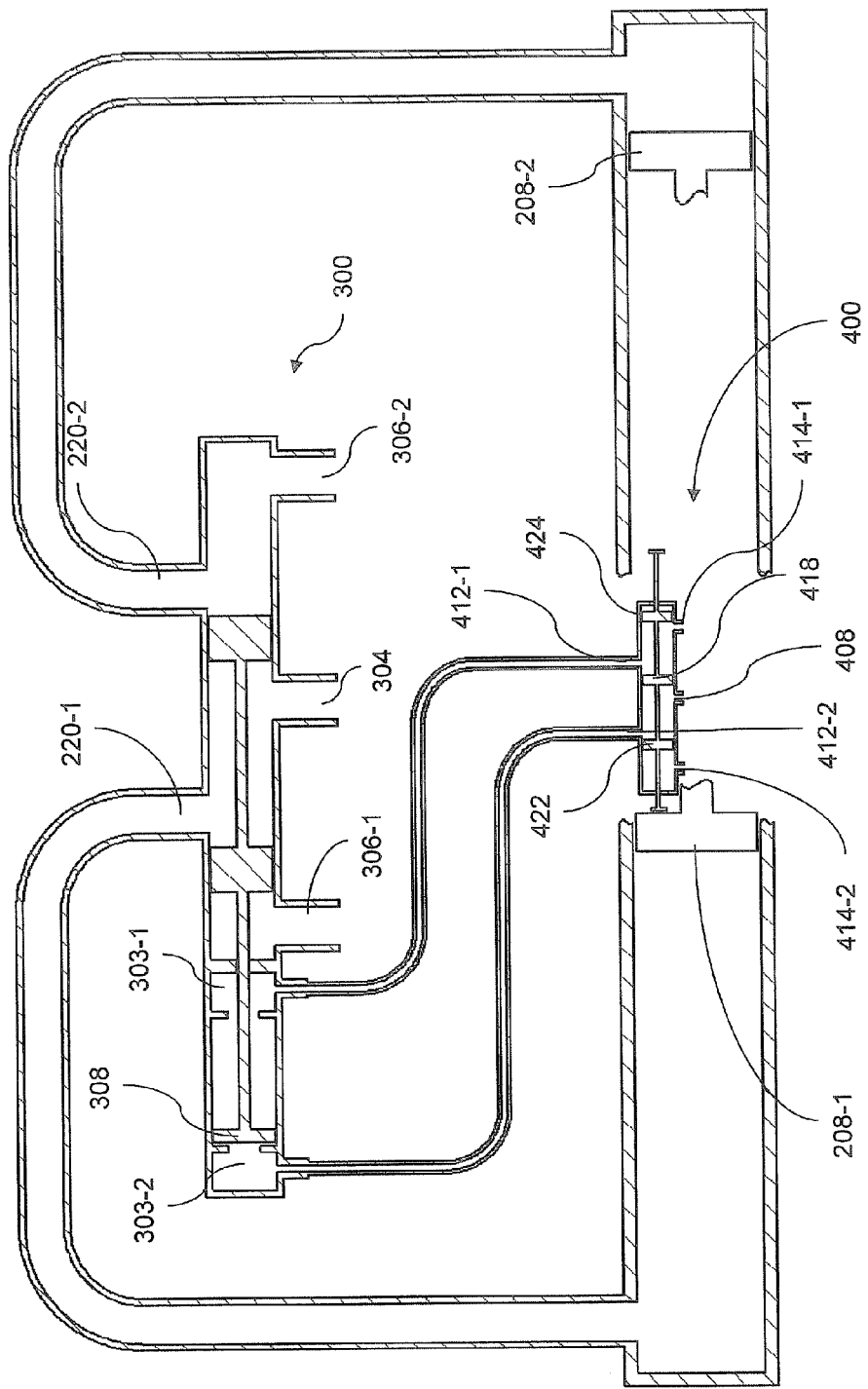
Figure 6C:
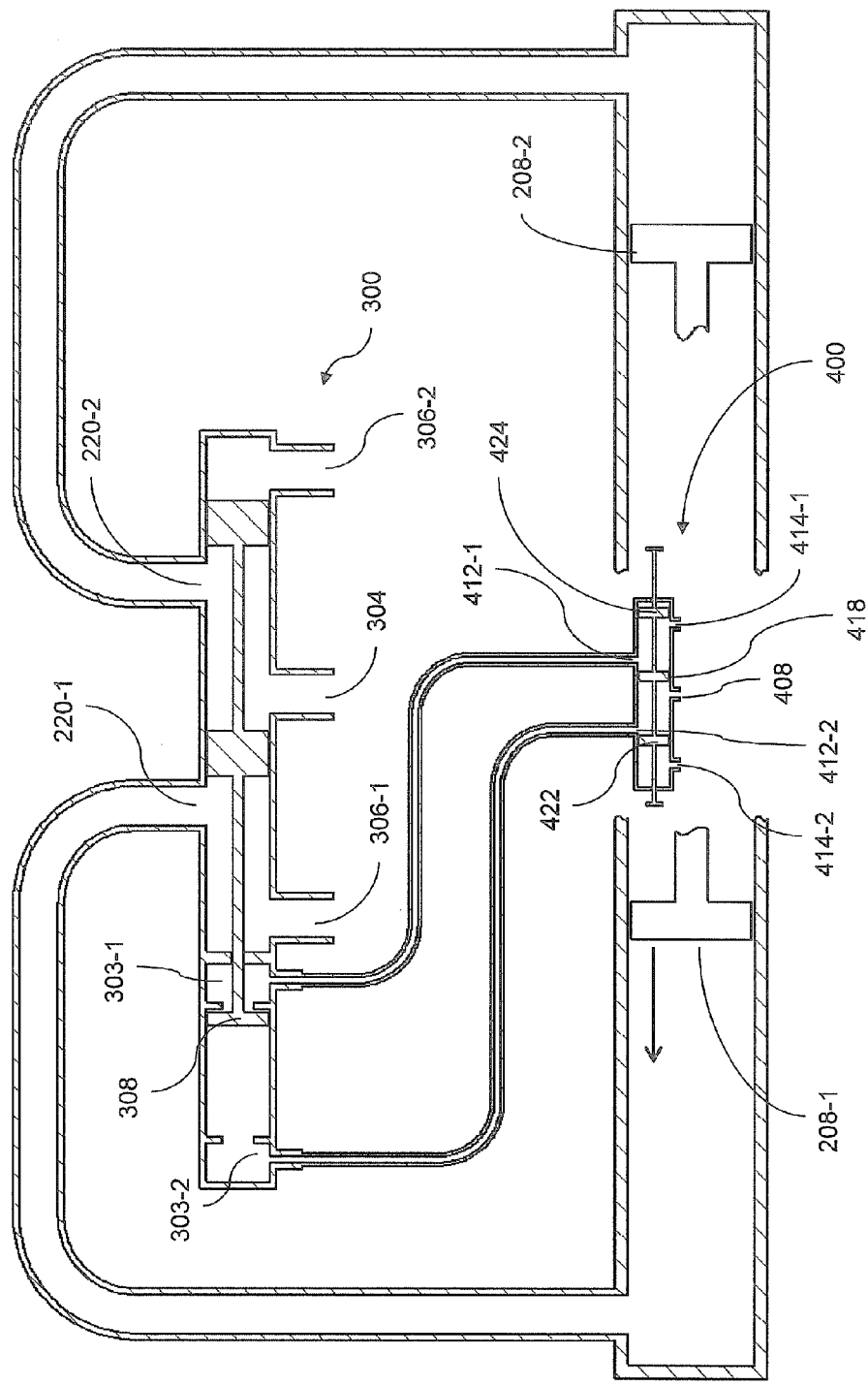

Operation of the system of FIGS. 2A-2B is essentially similar to that of the system of FIGS. 1A-1B as described above, and will not be repeated here. The function of the system of FIGS. 2A-2B differs from that of FIGS. 1A-1B primarily in the autonomous mechano-hydraulic reversal functionality provided by hydraulic switch 400 operating actuator 350 to change the state of selector 300. This functionality is presented schematically with reference to FIGS. 6A-6C. Specifically, as shown in FIG. 6A, as piston 208-1 moves to the right and nears the end of its stroke, it contacts switching rod 420 and begins to displace the switching rod and associated switching seals 418, 422 and 424 to the right. As the central seal passes fluid inlet 408, it is urged by fluid pressure to move to the fully-displaced right hand position as shown in FIG. 61, thereby connecting pressure inlet 408 to port 412-2, and thereby to volume 303-1. FIG. 6B represents the state immediately after the state of switch 400 has flipped, but before the resulting flow has changed the state of the selector. FIG. 6C shows the state very soon thereafter, after the actuator of selector 300 has caused the selector to switch states, thereby beginning the reverse (right-to-left as shown) power stroke.

As noted, outer faces 212-1 and 212-2 are preferably of effective surface area larger than inner faces 210-1 and 210-2, thereby achieving a corresponding slight pressure amplification to compensate from the difference between the spent brine outlet pressure of the reverse osmosis membrane array and the required inlet pressure. Preferably, outer faces 212-1 and 212-2 are 1%-5% larger than inner faces 211-1 and 210-2. The difference in effective surface area typically corresponds to the cross-sectional area of piston rod(s) used to interconnect pistons 208-1 and 208-2, and the number and size of the piston rods is chosen accordingly.

Working pressures for the power strokes of the energy recovery system are typically in the order of 60-80 bar. However, the pressure differential between fluid in fresh brine chambers 214-1 and 214-2 and spent brine chambers 216-1 and 216-2 is relatively small, and typically less than 5 bar. The "double-walled" structure of cylinder arrangements 200-1 and 200-2 with substantially the entirety of the cylinders surrounded by pressure vessel chambers allows for cylinders 204-1 and 204-2 to be manufactured from lower strength materials than could be used for cylinders which need to withstand larger pressure differentials. This greatly reduces manufacturing costs by separating the requirements of the precision piston-cylinder geometry from the load-bearing requirements applicable to pressure vessels 202-1 and 202-2. The pressure vessels themselves do not require precision surfaces for sliding contact with a piston, and can therefore be produced by lower precision manufacturing techniques. As previously noted, the double-walled structure of cylinder arrangements 200-1 and 200-2 also allows for ports 220-1 and 220-2 to be located farther from open ends 206-1 and 206-2, for example, in the middle third of the total length of the combined dual cylinder assembly. This greatly reduces the risks of connection failure due to cyclic expansion and contraction along the length of the cylinder as it experiences cyclic pressure changes.

As noted, the system illustrated in FIGS. 1A-2B is used to pump a portion of the fresh brine to reverse osmosis membrane array 10. Specifically, booster pump 109 and high pressure pump 108 together bring the fresh brine to the working pressure necessary for reverse osmosis membrane array 10 to desalinate the fresh brine. In parallel, the energy recovery system of the present invention employs the pressure of the spent brine exiting reverse osmosis membrane array 10 in supplying a proportion of the fresh brine input to the reverse osmosis membrane array 10.

The surface areas of the piston faces are preferably designed such that the resulting pressure amplification brings the output pressure of fresh brine from corresponding chambers 214-1 and 214-2 to slightly below the working pressure for the inlet to reverse osmosis membrane array 10, and the remaining pressure pressure boost required to maintain a desired flow rate through the energy recovery system is provided by variable speed feed pump 110. In this respect, it is noted that supplementation of the pressure of the fresh brine supplied by the cylinder arrangement to the reverse osmosis membrane array is achieved by transfer of force (here as tension) along piston rod(s) 218. For example, referring to FIG. 1b, during the power stroke from left to right in which spent brine entering chamber 216-1 pressurizes fresh brine in chamber 214-1 for delivery to reverse osmosis membrane array 10, pressure applied by feed pump 110 to fresh brine entering chamber 214-2 acts on surface 210-2 of piston 208-2 so as to apply tension along piston rods 218 and further boost the outlet pressure of fresh brine in chamber 214-1. This allows use of variable speed feed pump 110 to adjust the output of the energy recovery system, despite the fact that pump 110 operates at low pressures (typically no more than 6 bar) relative to the operating pressures of the spent brine inlet and the fresh brine output to the reverse osmosis membrane array, and is not in fluid flow connection with the high pressure chambers 214-1 or 214-2 during delivery of the fresh brine from those chambers to the reverse osmosis membrane array. Pump 110 preferably provides only a minor proportion (typically not more than about 5 percent) of the energy required to maintain the desired flow rate from the energy recovery system. Preferably, the outlet pressure of variable speed feed pump 110 is between 1-6 bar, and most preferably in the region of about 3 bar.

Control of variable speed pump 110 is preferably implemented as a function of the output flow rate of the energy recovery system, either measured directly by a flow measuring arrangement (not shown) or as indicated by the speed of movement of linked pistons 208-1 and 208-2. The optimal design flow rate for the energy recovery system is determined by the rate of spent brine flow out from the reverse osmosis membrane array, which is in turn determined by the working pressure, the membrane properties and the corresponding recovery ratio to be achieved. Variable speed feed pump 110 is preferably controlled by controller 112 to maintain the desired output flow rate.

The above approach of under-designing the hydraulic amplification of the energy recovery system and then supplementing a small margin using variable speed feed pump 110 ensures optimal use of the available power from the spent brine, and provides for particularly simple and effective control logic for the overall system. Where piston position is used as the monitored parameter for control of pump 110, positioning of at least one of the pistons is detected by a suitable sensor arrangement, such as a linear encoder 116 attached to at least one of the pressure vessels of the paired cylinder arrangement for encoding the position of pistons, and facilitating determination of the speed of piston movement. It is noted that alternatively other sensor devices, such as flow rate sensors and the like, can be used for determining the flow rate of spent brine to chambers 216-1 and 216-2 and providing the input to controller 112 for controlling variable speed feed pump 110.

Figure 7:
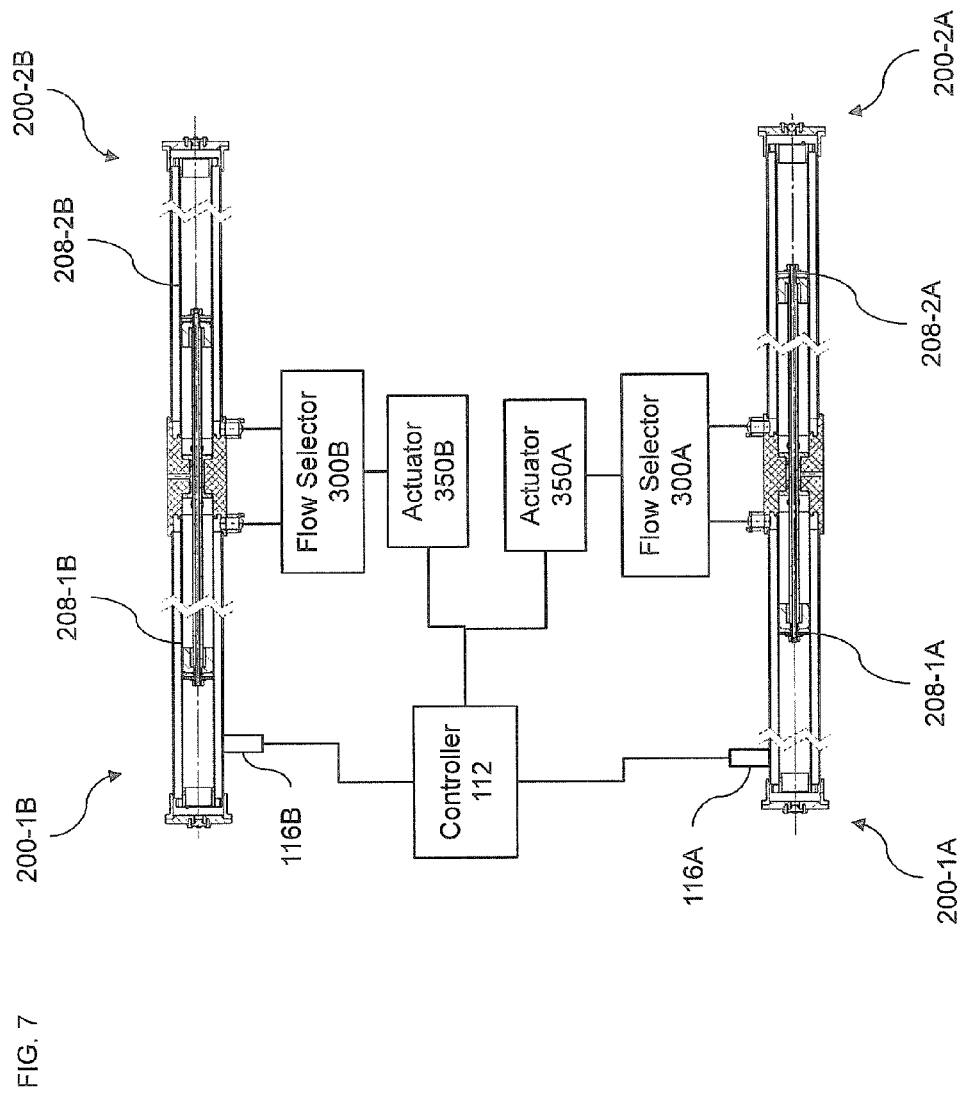
FIG. 7 is a schematic diagram showing a controlled out of phase supply of fresh brine to a reverse osmosis membrane array by a plurality of paired cylinder arrangements according to an embodiment of the invention.

In cases where a plurality of paired cylinder arrangements 20 are operating in parallel, it may be preferable to ensure that the pistons move out-of-phase with each other, i.e., changing directions at different times, in order to minimize the overall effect of any flow fluctuations which may occur during reversal of the piston direction at the end of each stroke. In the case of a system with electronic control of the flow selectors, out-of-phase operation is achieved simply by staggering the control signals for reversal of the different cylinders. As previously described, it is preferred that the positioning of at least one of the pistons of each paired cylinder arrangement is detected by a sensor arrangement. Referring to FIG. 7, as an example, an arrangement of two cylinder arrangement pairs, each with first and second cylinder arrangements 200-1 and 200-2 is considered. In this example, pistons 208-1A and 208-1B are mounted with linear encoders 116A and 116B, respectively, shown here only schematically. In this example, when in phase motion of pistons 208-1A and 208-1B is detected, controller 112 sends a control signal to one of the actuators, for example, actuator 350A, to actuate the corresponding flow selector 300A slightly earlier than would otherwise be required in order to ensure non-synchronous switching of direction of the two cylinder assemblies.

Figure 8:
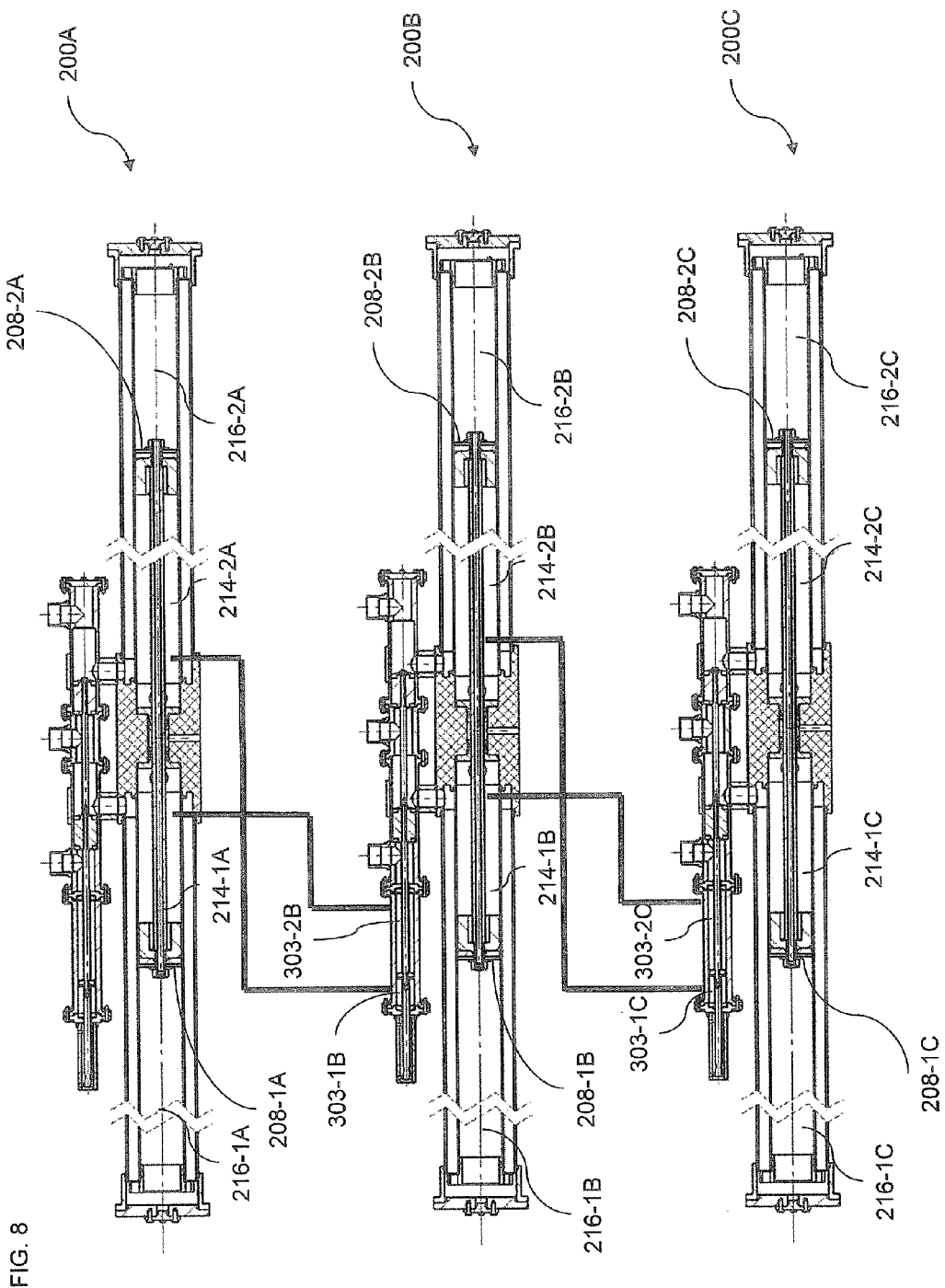
FIG. 8 is a schematic diagram showing a master paired cylinder arrangement in connection with a number of successive slave paired cylinder arrangements for a controlled rate of the supply of fresh brine to a reverse osmosis membrane array according to an embodiment of the invention.

When employing autonomous hydraulically-actuated stroke reversal, for example according to the system of FIGS. 2A-6C, if it is considered preferable to take precautions against simultaneous reversal of the piston direction for two cylinder assemblies, an alternative approach for ensuring out-of-phase operation of a plurality of energy recovery subsystems obviates the need for electronic control by employing a cascade approach to the hydraulic control where reversal of the stroke direction in a master cylinder assembly triggers sequential reversal of stroke direction in a chain of slave subsystems. This facilitates an implementation with all-hydraulic control. By way of non-limiting example, a chain configuration with three cylinder arrangements is shown in FIG. 8. In such a configuration, a master cylinder arrangement acts to control the stroke reversal of subsequent paired cylinder arrangements. This control cylinder arrangement is referred to herein as the master cylinder arrangement 200A. Master cylinder arrangement 200A preferably operates according to the description of paired cylinder arrangement 20, with stroke direction reversal either by a combination of a flow selector 300 and a hydraulic switch 400 arrangement as previously described or by any other hydraulic or electronic control arrangement suitable for a single paired cylinder arrangement. Each subsequent cylinder arrangement in the chain configuration is referred to herein as a slave cylinder arrangement. Each slave cylinder arrangement is structurally and operationally similarly to master cylinder arrangement 200A, with the exception that slave cylinder arrangements typically do not include a hydraulic switch 400 for actuating flow selectors 300B and 300C. Instead, the state switching of flow selector 300 for each slave subsystem is performed by pressure derived from the power stroke of the preceding cylinder arrangement in the chain which is delivered to the actuator of the selector for the slave cylinder arrange ent. With reference to FIG. 8, the hydraulic actuator chambers of the flow selector 300; of the first slave cylinder arrangement 200B are in fluid flow communication, respectively, with fresh brine chambers 214-1A and 214-2A of master cylinder arrangement 210B. In this configuration, master cylinder arrangement 200A actuates flow selector 300B to change the inflow and outflow of spent brine.

As previously described, the pressure stroke of piston 208-1A coincides with the simultaneous reverse stroke of piston 208-2A. This discharges fresh brine from fresh brine chamber 214-1A. As previously described, discharged fresh brine is supplied to fresh brine inlet 102 of reverse osmosis membrane array 10. Additionally, a fluid connection is here provided from fresh brine chamber 214-1A to volume 303-2B in order to actuate selector 300B to transition from its second state to its first state. This in turn directs the spent brine from reverse osmosis membrane array 10 to flow to spent brine chamber 216-1B, thereby moving piston 208-1B from its first position to its second position. When assembly 200A reverses direction, the pressure stroke of piston 208-2A begins, discharging highly pressurized fresh brine from fresh brine chamber 214-2A, which is also in fluid connection with volume 303-1B in order to actuate selector 300B to transition from its first state to its second state. This in turn switches the stroke direction of assembly 200B, directing spent brine from reverse osmosis membrane array 10 to spent brine chamber 216-2B, thereby moving piston 208-2B from its first position to its second position. The direction switching of pistons 208-1B and 208-2B thus comes at a temporal delay relative to the direction switching of pistons 208-1A and 208-2A. A similar interconnection is provided between assembly 200B and 200C, such that direction reversal of assembly 200C is triggered by, and occurs just after, direction reversal of assembly 200B. This cascade control scheme can be extended to a large number of cylinder assemblies, and is preferable deployed using 2-6 cylinder assemblies, and most preferably four cylinder assemblies.

The temporal delays between direction switching of successive cylinder arrangements can be adjusted by modifying the flow impedance of the conduits interconnecting flow selectors, but can reasonably be kept as short as possible. Although not depicted in FIG. 8, it should also be apparent that each spent brine inlet port 304A, 304B, and 304C is in fluid flow connection with spent brine outlet 104 of reverse osmosis membrane array 10.

As previously mentioned, the chain configuration shown in FIG. 8 is advantageous in that it does not require electronic equipment for maintaining average flow with low fluctuation. Furthermore, the fresh brine from the fresh brine source is used as the motive fluid for operating all slave cylinder arrangements, thereby reducing the need for pressure pumps for hydraulic fluid. As mentioned above, the number of cylinder arrangements is not limited to the number of arrangement depicted in FIG. 8.

Although shown here by example in an implementation in which fresh brine from each cylinder arrangement is used to drive hydraulic switching of the selector from the subsequent cylinder arrangement in the chain, other forms of connection can be used to achieve an equivalent cascade control function. For example, connections from the spent brine chambers 216-1 and 216-2 of each assembly to the selector actuator volumes of the subsequent assembly in the chain is also effective to achieve the desired cascade control.

It should be noted that the various aspects of the present invention described herein may each be used to advantage independently of other aspects of the invention as presented herein. For example, the various hydraulic control solutions presented herein, although presented in a particularly preferred context of the double-walled cylinder structures of the present invention, may also be used to advantage with otherwise conventional single-walled cylinder constructions.

It will be appreciated that the above descriptions are intended only to serve as examples, and that many other embodiments are possible within the scope of the present invention as defined in the appended claims.

What is claimed is:

1. A cylinder arrangement for use with a reverse osmosis membrane array that receives pressurized fresh brine and generates pressurized spent brine, the cylinder arrangement comprising:
   (a) a hollow cylinder having an inner surface and an internal volume;
   (b) a piston in sliding engagement with said inner surface so as to subdivide said internal volume into a first internal volume forming at least part of a first chamber and a second internal volume forming at least part of a second chamber; and
   (c) an arrangement of flow connections configured for directing the pressurized spent brine to said first chamber so as to act on said piston, thereby applying pressure to fresh brine within said second chamber for delivery to the reverse osmosis membrane array,
   wherein said cylinder arrangement further comprises a pressure vessel enveloping substantially the entirety of said hollow cylinder, said pressure vessel defining at least one enveloping volume selected from the group consisting of: a first enveloping volume in fluid flow communication with said first internal volume; and a second enveloping volume in fluid flow communication with said second internal volume.

2. The cylinder arrangement of claim 1, wherein said piston has an inner face facing said second internal volume and an outer face facing said first internal volume, said outer face having larger effective surface area than said inner face for pressure amplification.

3. A paired cylinder arrangement comprising:
   (a) a first cylinder arrangement, said first cylinder arrangement being according to claim 2; and
   (b) a second cylinder arrangement comprising:
      (i) a hollow cylinder having an inner surface and an internal volume; and
      (ii) a piston in sliding engagement with said inner surface of said second cylinder arrangement so as to subdivide said internal volume of said second cylinder arrangement into a first internal volume forming at least part of a first chamber and a second internal volume forming at least part of a second chamber,
   wherein said arrangement of flow connections is further configured for directing the pressurized spent brine to said first chamber of said second cylinder arrangement so as to act on said piston of said second cylinder arrangement, thereby applying pressure to fresh brine within said second chamber of said second cylinder arrangement for delivery to the reverse osmosis membrane array, and wherein said second cylinder arrangement further comprises a pressure vessel enveloping substantially the entirety of said hollow cylinder of said second cylinder arrangement, said pressure vessel defining at least one enveloping volume selected from the group consisting of: a first enveloping volume in fluid flow communication with said first internal volume of said second cylinder arrangement; and a second enveloping volume in fluid flow communication with said second internal volume of said second cylinder arrangement,
and wherein said pistons of said first and second cylinder arrangements are mechanically linked such that, when the pressurized spent brine is directed to said first chamber of said first cylinder arrangement the pressurized spent brine is simultaneously discharged from the said first chamber of said second cylinder arrangement,
and such that, when the pressurized spent brine is directed to said first chamber of said second cylinder arrangement the pressurized spent brine is simultaneously discharged from the said first chamber of said first cylinder arrangement.

4. The paired cylinder arrangement of claim 3, wherein said pistons of said first and second cylinder arrangements are mechanically linked by at least one piston rod interconnecting said pistons of said first and second cylinder arrangements for simultaneous movement.

5. The paired cylinder arrangement of claim 3, wherein said arrangement of flow connections comprises:
(a) a flow selector having an inlet port for an inflow of pressurized spent brine from the reverse osmosis membrane array, said flow selector assuming a first state in which said inlet port is in fluid connection with said first chamber of said first cylinder arrangement and a second state in which said inlet port is in fluid connection with said first chamber of said second cylinder arrangement;
(b) a bidirectional hydraulic actuator associated with said flow selector for switching said flow selector between said first state and said second state; and
(c) a hydraulic switch having a switch inlet port for the inflow of a pressurized hydraulic fluid and having two hydraulic connections to said hydraulic actuator for actuating said hydraulic actuator,
wherein said hydraulic switch is deployed so as to be acted on by said piston of said first cylinder arrangement during a stroke of said piston so as to assume a first switch state in which pressure from said switch inlet port is directed to a first of said hydraulic connections so as to actuate said actuator to switch said flow selector to said second state,
and wherein said hydraulic switch is further deployed so as to be acted on by said piston of said second cylinder arrangement during a stroke of said piston so as to assume a second switch state in which pressure from said switch inlet port is directed to a second of said hydraulic connections so as to actuate said actuator to switch said flow selector to said first state.

6. The paired cylinder arrangement of claim 5, wherein said hydraulic actuator includes an actuator piston displaceable within an actuator cylinder.

7. The paired cylinder arrangement of claim 5, wherein said switch inlet port is connected to receive spent brine delivered from an outlet of the reverse osmosis membrane array.

8. A paired cylinder arrangement for use with a reverse osmosis membrane array that receives pressurized fresh brine and generates pressurized spent brine, the cylinder arrangement comprising:
(a) a first cylinder assembly comprising:
  (i) a first hollow cylinder; and
  (ii) a first piston in sliding engagement within said first hollow cylinder so as to at least partially define a first chamber and a second chamber;
(b) a second cylinder assembly comprising:
  (i) a second hollow cylinder; and
  (ii) a second piston in sliding engagement within said second hollow cylinder so as to at least partially define a first chamber and a second chamber;
(c) a flow selector having an inlet port for an inflow of pressurized spent brine from the reverse osmosis membrane array, said flow selector assuming a first state in which said inlet port is in fluid connection with said first chamber of said first cylinder assembly and a second state in which said inlet port is in fluid connection with said first chamber of said second cylinder assembly;
(d) a bidirectional hydraulic actuator associated with said flow selector for switching said flow selector between said first state and said second state; and
(e) a hydraulic switch having a switch inlet port for the inflow of a pressurized hydraulic fluid and having two hydraulic connections to said hydraulic actuator for actuating said hydraulic actuator,
wherein said hydraulic switch is deployed so as to be acted on by said first piston during a stroke of said first piston so as to assume a first switch state in which pressure from said switch inlet port is directed to a first of said hydraulic connections so as to actuate said actuator to switch said flow selector to said second state,
and wherein said hydraulic switch is further deployed so as to be acted on by said second piston during a stroke of said second piston so as to assume a second switch state in which pressure from said switch inlet port is directed to a second of said hydraulic connections so as to actuate said actuator to switch said flow selector to said first state,
wherein said first cylinder assembly further comprises a pressure vessel enveloping substantially the entirety of said first hollow cylinder, said pressure vessel defining at least one enveloping volume selected from the group consisting of: a first enveloping volume in fluid flow communication to form part of said first chamber; and a second enveloping volume in fluid flow communication to form part of said second chamber, and wherein said second cylinder assembly further comprises a pressure vessel enveloping substantially the entirety of said second hollow cylinder, said pressure vessel defining at least one enveloping volume selected from the group consisting of: a first enveloping volume in fluid flow communication to form part of said first chamber and a second enveloping volume in fluid flow communication to form part of said second chamber.

9. The paired cylinder arrangement of claim 8, wherein said switch inlet port is connected to receive spent brine delivered from an outlet of the reverse osmosis membrane array.

10. The paired cylinder arrangement of claim 8, wherein said actuator comprises an actuator piston displaceable within an actuator cylinder.

11. A method for controlling an energy recovery subsystem for use with a reverse osmosis membrane array that receives pressurized fresh brine and generates pressurized spent brine, the energy recovery subsystem including at least one cylinder arrangement comprising:
(a) a first cylinder assembly comprising a first hollow cylinder, and a first piston in sliding engagement within said first hollow cylinder so as to at least partially define a first chamber and a second chamber, said first piston having an inner face facing said second chamber and an outer face facing said first chamber, said outer face having larger effective surface area than said inner face for pressure amplification;

(b) a second cylinder assembly comprising a second hollow cylinder, and a second piston in sliding engagement within said second hollow cylinder so as to at least partially define a first chamber and a second chamber, said second piston having an inner face facing said second chamber and an outer face facing said first chamber, said outer face having larger effective surface area than said inner face for pressure amplification;

(c) at least one piston rod interconnecting said first piston and said second piston; and (d) an arrangement of flow connections configured for directing the pressurized spent brine alternately to said first chamber of said first cylinder assembly so as to act on said first piston, thereby applying amplified pressure to fresh brine within said second chamber for delivery to the reverse osmosis membrane array in a first power stroke, and to said first chamber of said second cylinder assembly so as to act on said second piston, thereby applying amplified pressure to fresh brine within said second chamber for delivery to the reverse osmosis membrane array in a second power stroke, the method comprising the steps of:

(i) determining a flow rate of spent brine by monitoring at least one parameter selected from the group consisting of: a position of said first piston, said second piston or said piston rod; a speed of said first piston, said second piston or said piston rod; and an output flow rate of the fresh brine from said first power stroke or said second power stroke; and (ii) adjusting an output pressure of a variable pump affecting a supply pressure for fresh brine for filling said second chamber of said second cylinder arrangement during said first power stroke and for filling said second chamber of said first cylinder arrangement during said second power stroke, thereby providing a working pressure of fresh brine to the reverse osmosis membrane array, and wherein said first cylinder assembly further comprises a pressure vessel enveloping substantially the entirety of said first hollow cylinder, said pressure vessel defining at least one enveloping volume selected from the group consisting of: a first enveloping volume in fluid flow communication to form part of said first chamber; and a second enveloping volume in fluid flow communication to form part of said second chamber, and wherein said second cylinder assembly further comprises a pressure vessel enveloping substantially the entirety of said second hollow cylinder said pressure vessel defining at least one enveloping volume selected from the group consisting of: a first enveloping volume in fluid flow communication to form part of said first chamber; and a second enveloping volume in fluid flow communication to form part of said second chamber.

12. An energy recovery subsystem for use with a reverse osmosis membrane array that receives pressurized fresh brine and generates pressurized spent brine, the energy recovery subsystem comprising a master cylinder arrangement and a first slave cylinder arrangement, each of said cylinder arrangements comprising:

(a) a first cylinder assembly comprising a first hollow cylinder, and a first piston in sliding engagement within said first hollow cylinder so as to at least partially define a first chamber and a second chamber;

(b) a second cylinder assembly comprising a second hollow cylinder, and a second piston in sliding engagement within said second hollow cylinder so as to at least partially define a first chamber and a second chamber;

(c) at least one piston rod interconnecting said first piston and said second piston; and (d) a flow selector assuming a first state in which the pressurized spent brine is directed to said first chamber of said first cylinder assembly so as to act on said first piston, thereby applying pressure to fresh brine within said second chamber for delivery to the reverse osmosis membrane array in a first power stroke, and a second state in which the pressurized spent brine is directed to said first chamber of said second cylinder assembly so as to act on said second piston, thereby applying pressure to fresh brine within said second chamber for delivery to the reverse osmosis membrane array in a second power stroke, the energy recovery system further comprising a hydraulic actuator associated with said flow selector of said first slave cylinder arrangement, said hydraulic actuator being in fluid communication with said master cylinder arrangement such that:

(i) during said first power stroke of said master cylinder arrangement, pressure from said first power stroke is effective to operate said hydraulic actuator to switch said flow selector of said first slave cylinder arrangement to said first state; and (ii) during said second power stroke of said master cylinder arrangement, pressure from said second power stroke is effective to operate said hydraulic actuator to switch said flow selector of said first slave cylinder arrangement to said second state, and wherein said first cylinder assembly further comprises a pressure vessel enveloping substantially the entirety of said first hollow cylinder, said pressure vessel defining at least one enveloping volume selected from the group consisting of: a first enveloping volume in fluid flow communication to form part of said first chamber; and a second enveloping volume in fluid flow communication to form part of said second chamber, and wherein said second cylinder assembly further comprises a pressure vessel enveloping substantially the entirety of said second hollow cylinder, said pressure vessel defining at least one enveloping volume selected from the group consisting of: a first enveloping volume in fluid flow communication to form part of said first chamber; and a second enveloping volume in fluid flow communication to form part of said second chamber.

13. The energy recovery system of claim 12, further comprising a second slave cylinder arrangement comprising:

(a) a first cylinder assembly comprising a first hollow cylinder, and a first piston in sliding engagement within said first hollow cylinder so as to at least partially define a first chamber and a second chamber;

(b) a second cylinder assembly comprising a second hollow cylinder, and a second piston in sliding engagement within said second hollow cylinder so as to at least partially define a first chamber and a second chamber;

(c) at least one piston rod interconnecting said first piston and said second piston;

(d) a flow selector assuming a first state in which the pressurized spent brine is directed to said first chamber of said first cylinder assembly so as to act on said first piston, thereby applying pressure to fresh brine within said second chamber for delivery to the reverse osmosis membrane array in a first power stroke, and a second state in which the pressurized spent brine is directed to said first chamber of said second cylinder assembly so as to act on said second piston, thereby applying pressure to fresh brine within said second chamber for delivery to the reverse osmosis membrane array in a second power stroke; and (e) a hydraulic actuator associated with said flow selector of said second slave cylinder arrangement, said hydraulic actuator being in fluid communication with said first slave cylinder arrangement such that:

(i) during said first power stroke of said first slave cylinder arrangement, pressure from said first power stroke is effective to operate said hydraulic actuator to switch said flow selector of said second slave cylinder arrangement to said first state; and (ii) during said second power stroke of said first slave cylinder arrangement, pressure from said second power stroke is effective to operate said hydraulic actuator to switch said flow selector of said second slave cylinder arrangement to said second state.

14. The paired cylinder arrangement of claim 8, wherein said flow selector further comprises:

(i) a hollow cylinder with regions having first and second internal diameters, said first diameter being larger than said second diameter, said inlet port being in fluid flow connection with said cylinder;

(ii) a first outlet port in fluid flow connection with said first chamber of said first cylinder assembly;

(iii) a second outlet port in fluid flow connection with said first chamber of said second cylinder assembly;

(iv) a first seal movable within said cylinder between a first-seal first position and a first-seal second position;

(v) a second seal movable within said cylinder between a second-seal first position and a second-seal second position; and (vi) at least one rod interconnecting said first seal and said second seal for simultaneous movement, wherein each of said positions is defined by a step formed by a change in said internal diameter, and wherein said flow selector is operable to assume a first state in which said first seal is in said first-seal first position and said second seal is in said second-seal second position, thereby allowing the flow of spent brine from said inlet port to said first chamber of said first cylinder assembly, and wherein said flow selector is further operable to assume a second state in which said first seal is in said first-seal second position and said second seal is in said second-seal first position, thereby allowing the flow of spent brine from said inlet port to said first chamber of said second cylinder assembly.

\* \* \* \* \*